(12) United States Patent
Spreitzer

(10) Patent No.: US 8,973,530 B2
(45) Date of Patent: Mar. 10, 2015

(54) CAT LITTER BOX CLEANING SYSTEM

(76) Inventor: Eleanor Spreitzer, Columbus, OH (US)

(*) Notice: Subject to any disclaimer, the term of this patent is extended or adjusted under 35 U.S.C. 154(b) by 1357 days.

(21) Appl. No.: 12/510,396

(22) Filed: Jul. 28, 2009

(65) Prior Publication Data

US 2009/0283049 A1 Nov. 19, 2009

Related U.S. Application Data

(63) Continuation-in-part of application No. 11/384,086, filed on Mar. 17, 2006, now abandoned.

(51) Int. Cl.
*A01K 29/00* (2006.01)
*A01K 1/01* (2006.01)

(52) U.S. Cl.
CPC .................. *A01K 1/0114* (2013.01)
USPC .......................... 119/166; 119/165

(58) Field of Classification Search
USPC ................. 119/165–167
See application file for complete search history.

(56) References Cited

U.S. PATENT DOCUMENTS

| | | | | |
|---|---|---|---|---|
| 4,766,845 A * | 8/1988 | Bavas | ............ | 119/165 |
| 4,870,924 A * | 10/1989 | Wolfe | ............ | 119/167 |
| 5,211,133 A * | 5/1993 | Foley | ............ | 119/166 |
| 5,755,182 A * | 5/1998 | Brown et al. | ............ | 119/166 |

* cited by examiner

*Primary Examiner* — Peter M Poon
*Assistant Examiner* — Kathryn L Thompson
(74) *Attorney, Agent, or Firm* — Michael J. Gallagher; David J. Dawsey; Gallagher & Dawsey Co., LPA

(57) ABSTRACT

A cat litter box cleaning system designed to sieve waste clumps from cat litter is provided. The cat litter box cleaning system has multiple layers thereby providing multiple cleaning operations. The layers may consist of a sieving layer and a liner. The liner shields the sieving layer from the cat's claws and the sieving layer is used to remove the waste from the litter. Each sieving layer and liner releasably cooperates with layer securing fixtures. The layer securing fixtures releasably attach the layers to a base and prevent the cat from dislodging the sieves or liners. Access ports may be provided for removing the layers from the layer securing fixtures without having to come into contact with the cat litter. A method is provided where at least two cat litter box cleaning systems are utilized to ensure that fresh cat litter always forms the basis of the litter used.

4 Claims, 26 Drawing Sheets

CAT LITTER BOX CLEANING SYSTEM

CROSS-REFERENCE TO RELATED APPLICATIONS

This application is a continuation-in-part of U.S. patent application Ser. No. 11/384,086, filed on Mar. 17, 2006 now abandoned, the content of which is incorporated by reference as if completely written herein.

TECHNICAL FIELD

The disclosure herein relates to systems for sieving solidified waste from granular material to dispose of the waste and reuse the granular material, and, more particularly, to a cat litter cleaning system having a base with sides, a layer fixture system for retaining multiple alternating layers of sieves for removing the waste from the litter and liners for protecting the sieves from a cat's claws.

BACKGROUND OF THE INVENTION

Pet owners know that part of being a responsible pet owner is providing for their pet's needs. Cats are popular domestic pets, and like many other pets, they spend time indoors. Most cat owners provide a litter box in the home. The litter box serves as a place for the cat to relieve themselves. The litter box is filled with cat litter. Cat litter is available in many brands and can vary by function. Types of cat litter include specially treated recycled paper; all natural litter, so if the cat eats it, the cat will not be sickened; and other types that serve a specific purpose. For example, there is cat litter containing an additive that changes color depending on the acidity of the cat's urine and is used for determining if the cat has a urinary tract infection. Cat litter has numerous other and more common functions. Mainly, it helps eliminate the odor from feces and urine and therefore helps keep the home from smelling like cat waste. Cat litter is usually composed of many individual particles or granules. The individual granules clump together in the presence of urine or feces, absorbing the fluids and odor. The clumping ability varies by litter type and, because of its importance, clumping can be a selling point for pet owners.

The odor reduction extends the time between cleanings. However, eventually the continued use of the litter box overwhelms the cat litter. Therefore, the litter must be frequently cleaned and fresh litter added or the litter must be dumped and replaced. For litter boxes having clumping litter, cleaning the litter box consists essentially of removing the clumps of urine and feces. The clumping action of the litter is important to cat owners because it makes cleaning less difficult. In particular, hard clumps make cleaning the litter box easier. The simplest way to remove the clumps of waste is to dig each of the clumps out with a spoon. A harder clump is more durable and resists break down when handled. In any event, digging out the waste clumps becomes a never-ending, dirty task.

There remains an unfulfilled need to provide a cat litter cleaning system which is cost effective to manufacture, easy and convenient to use, reduces the time spent cleaning cat waste out of the litter, and is hygienically designed.

SUMMARY OF INVENTION

In its most general configuration, the cat litter box cleaning system advances the state of the art with a variety of new capabilities and overcomes many of the shortcomings of prior devices in new and novel ways. In its most general sense, the cat litter box cleaning system overcomes the shortcomings and limitations of the prior art in any of a number of generally effective configurations. The cat litter box cleaning system demonstrates such capabilities and overcomes many of the shortcomings of prior methods in new and novel ways.

The cat litter box cleaning system provides a method for conveniently removing a cat's waste from litter. The waste clumps are an aggregate of the litter granules agglomerated by urine, feces, or a combination of both. The waste clumps are larger than the individual litter granules making removal of the waste clumps possible with a sieve.

A base has a granule contact surface, a base perimeter, and at least two layer securing fixtures. The base perimeter has a wall extending at a substantially perpendicular angle to the granule contact surface to a wall height, and the layer securing fixtures are located within the base perimeter. The cat litter box cleaning system has a first layer.

The first layer has a first sieve and a first liner. The first sieve has at least two first sieve securing receptacles. The first sieve may be formed with a plurality of similarly sized openings. The openings should be large enough to allow unused litter granules to pass through the openings while at the same time prohibiting waste clumps from passing through the openings.

The first liner has at least two first liner securing receptacles, a first liner granule contact surface, a first liner bottom surface, and a first liner perimeter. The first liner shields the first sieve from the cat. The first sieve perimeter and the first liner perimeter are substantially the same shape and size as the base perimeter. The first liner may be a sheet of material that covers the first sieve.

The first sieve and the first liner are assembled in a specific order. The first sieve is placed within the base with each first sieve securing receptacle being releasably attached to one layer securing fixture. Once in position, the first sieve bottom surface is adjacent to the base granule contact surface. The first liner is inserted into the base with one first liner securing receptacle being releasably attached to one layer securing fixture. The first liner bottom surface is adjacent to the first sieving surface.

The first sieve and the first liner are secured in position by the layer securing fixtures. Once the first sieve and the first liner are secured into position, the litter granules are added.

The cat will eventually eliminate in the litter. The litter granules will adhere to the waste forming the waste clumps. At some point the owner will clean the cat litter by removing the waste clumps. In an embodiment of the cat litter box cleaning system having the first layer, the owner will first disconnect the first liner from the layer securing fixture. The owner will then dump the litter, including the waste clumps, from the first liner onto the first sieving surface. The owner removes the first liner for disposal or storage, as will be discussed below. The first sieve securing receptacles are released from the layer securing fixtures while the litter granules and the waste clumps are on the first sieving surface. By lifting the first sieve from the base, the litter granules pass through the first sieve and onto the granule contact surface, which leaves the waste clumps on the first sieving surface. The owner can then dispose of the waste clumps.

In another embodiment, the cat litter box cleaning system has a plurality of layers. In one embodiment, allowing for daily changes in a weekly cycle, in addition to the first layer described above, the system would have six additional layers, a second, a third, a fourth, a fifth, a sixth, and a seventh. Each of the sieves has similar features to the first sieve and each of the liners has similar features to the first liner.

In another embodiment, the layer securing fixtures are posts having a securing fixture height and a cross section that cooperates with a human finger. In yet another embodiment, the base has a liner storage compartment to releasably house the liners.

In yet another embodiment, the wall may be formed with gripping alcoves. The gripping alcoves may cooperate with the layer securing fixtures. The owner may easily place a hand into the gap created by the gripping alcove to grasp the liner or the sieve in question.

In still another embodiment, the sieves have a sieve gripping extension and the liners have liner gripping extensions. The sieve gripping and liner gripping extensions are attached to the sieve and liner perimeters and extend upwards along the wall out of the litter granules. In another embodiment, the first sieve gripping extensions are sieve gripping extension tabs and the liner gripping extensions are liner gripping extension tabs to further ease sieve and liner removal.

The cat litter box cleaning system disclosed herein enables a significant advance in the state of the art. Variations, modifications, alternatives, and alterations of the various preferred embodiments may be used alone or in combination with one another, as will become more readily apparent to those with skill in the art with reference to the following detailed description of the preferred embodiments and the accompanying figures and drawings.

BRIEF DESCRIPTION OF THE DRAWINGS

Without limiting the scope of the cat litter box cleaning system as claimed below and referring now to the drawings and figures:

DETAILED DESCRIPTION OF THE INVENTION

A cat litter box cleaning system (100) enables a significant advance in the state of the art. The preferred embodiments of the device accomplish this by new and novel arrangements of elements and methods that are configured in unique and novel ways and which demonstrate previously unavailable but preferred and desirable capabilities. The detailed description set forth below in connection with the drawings is intended merely as a description of the presently preferred embodiments of the cat litter box cleaning system (100), and is not intended to represent the only form in which the cat litter box cleaning system (100) may be constructed or utilized. The description sets forth the designs, functions, means, and methods of implementing the cat litter box cleaning system (100) in connection with the illustrated embodiments. It is to be understood, however, that the same or equivalent functions and features may be accomplished by different embodiments that are also intended to be encompassed within the spirit and scope of the claimed cat litter box cleaning system (100).

The cat litter box cleaning system (100) disclosed herein provides a method for conveniently removing a cat's waste from a plurality of litter granules (10). As one skilled in the art will recognize, litter granules (10) are available in many types. Litter granules (10) may be specially processed recycled paper products, clay minerals, "all natural" materials, and other proprietary mixes. Many types of litter granules (10) form "waste clumps" (20). The waste clumps (20) are agglomerations of the litter granules (10) adhered together by urine, feces, or a combination of both. The waste clumps (20) are larger than the individual litter granules. A sieve can be used to remove the waste clumps (20) due to the relative size difference between the waste clumps (20) and the litter granules (10).

Figure 1:
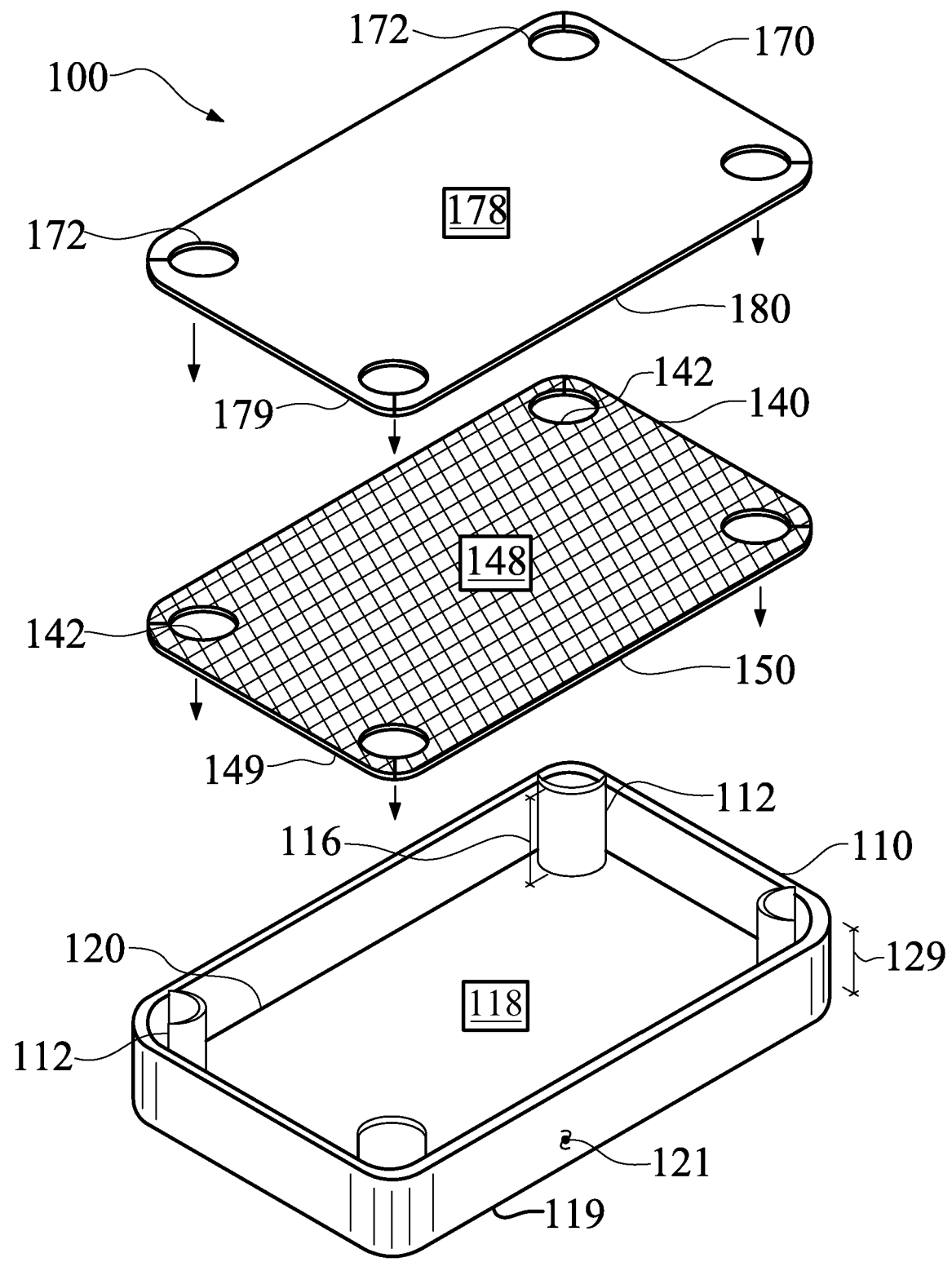
FIG. 1 is an isometric view of an embodiment of the cat litter cleaning system showing the base and a first layer, not to scale.

In one embodiment, as seen in FIG. 1, the cat litter box cleaning system (100) includes a base (110) having a granule contact surface (118), a base perimeter (120), a support surface (119), and at least two layer securing fixtures (112). Generally, the cat litter cleaning system (100) is placed with the support surface (119) in contact with a floor or other horizontal surface. The base perimeter (120) has a wall (121) extending at a substantially perpendicular angle from the granule contact surface (118) to a wall height (129). The layer securing fixtures (112) are located within the base perimeter (120). The layer securing fixtures (112) will be described in more detail below.

As one skilled in the art will appreciate, the layer securing fixtures (112), the base (110), and the wall (121) may be formed as a unitary body. In another embodiment, the layer securing fixtures (112) may be separate structures attached to the base (110) with screws, glue, or other fasteners capable of anchoring the layer securing fixtures (112) to the base (110). In yet another embodiment, the base (110), the wall (121), and the layer securing fixtures (112) may be made out of heavy plastic. The wall height (129) may be between approximately three and approximately twelve inches, and may be limited only by the height the cat is willing to jump. With continued reference to FIG. 1, the cat litter box cleaning system (100) has a first layer. The first layer has a first sieve (140) and a first liner (170).

The first sieve (140) has at least two first sieve securing receptacles (142), a first sieving surface (148), a first sieve bottom surface (149), and a first sieve perimeter (150). The number of the first sieve securing receptacles (142) is greater than or equal to the number of layer securing fixtures (112). The first sieve securing receptacles (142) align with the layer securing fixtures (112) so that one first sieve securing receptacle (142) is positioned to cooperate with one layer securing fixture (112) in a such a manner that the first sieve perimeter (150) and the base perimeter (120) are substantially coincident. As one skilled in the art will recognize, the first sieve (140) is formed with a plurality of similarly sized openings extending from the first sieving surface (148) to the first sieve bottom surface (149). By way of example only, and not limitation, the first sieve (140) may be made by weaving monofilament fibers or by stamping openings in a solid sheet. Moreover, the first sieve (140) may be a netting formed of plastic, rubber, rope, or other materials. Thus, the first sieve (140) may be rigid or flexible. The openings may be any shape and are large enough to allow unused litter granules (10) to pass through the openings, while at the same time prohibiting the waste clumps (20) from passing through the openings. The first sieve perimeter (150) may be substantially the same as the base perimeter (120).

With continued reference to FIG. 1, the first liner (170) has at least two first liner securing receptacles (172), a first liner granule contact surface (178), a first liner bottom surface (179), and a first liner perimeter (180). Although the number of first liner securing receptacles (172) may be equal to the number of layer securing fixtures (112), as shown in FIG. 1, the number of first liner securing receptacles may be greater than the number of layer securing fixtures (112). The positions of the first liner securing receptacles (172) align with the layer securing fixtures (112) so that one first liner securing receptacle (172) is positioned to cooperate with one layer securing fixture (112) in such a manner that the first liner perimeter (180) and the base perimeter (120) are substantially adjacent. As one skilled in the art will appreciate, the first sieve securing receptacles (142) need not be the same type of receptacle as the first liner securing receptacles (172). In one embodiment, the first sieve securing receptacle (142) is a reinforced hole that releasably cooperates with the layer securing fixture (112) and the first liner securing receptacle (172) is an expandable, elastic noose that frictionally grips the layer securing fixture (112). In another embodiment, as seen in FIG. 1, the first sieve (140) has precut areas that extend from the first sieve securing receptacles (142) to the first sieve perimeter (150) and the first liner (170) has precut areas that extend from the first liner securing receptacles (172) to the first liner perimeter (180). The precut areas may permit easy removal of the first sieve (140) and the first liner (170) past the layer securing fixtures (112).

Both the first sieve (140) and the first liner (170) are held in position by at least two layer securing fixtures (112). As previously mentioned, the layer securing fixtures (112) are positioned within the base perimeter (120). The layer securing fixtures (112) substantially prevent the cat from dislodging or moving the first liner (170) relative to the base (110) or relative to the first sieve (140). If the cat is able to move the first liner (170), the first sieve (140) may be damaged, or otherwise compromised. In either case, the functioning of the cat litter cleaning system (100) may be inhibited. As one skilled in the art will recognize, more than two layer securing fixtures (112) may also hold the first liner (170) and first sieve (140) in position. The positioning of the layer securing fixtures (112) is such that any translational force exerted by the cat on the first liner (170) or the first sieve (140) is resisted by at least one layer securing fixture (112) thereby substantially preventing the first liner (170) or the first sieve (140) from being substantially dislodged.

One purpose of the first liner (170) is to shield the first sieve (140) from the cat, particularly the cat's claws. The first liner (170) may be a sheet of flexible or rigid material. The material may be cardboard, plastic, heavy aluminum foil, treated wood, or other urine or feces resistant material. The material may also be resistant to occasional clawing when the cat manages to get its claws in contact with the first liner (170). In another embodiment, the first liner (170) has a smooth surface texture to prevent the cat from snagging their claws on the first liner granule contact surface (178).

Figure 2:
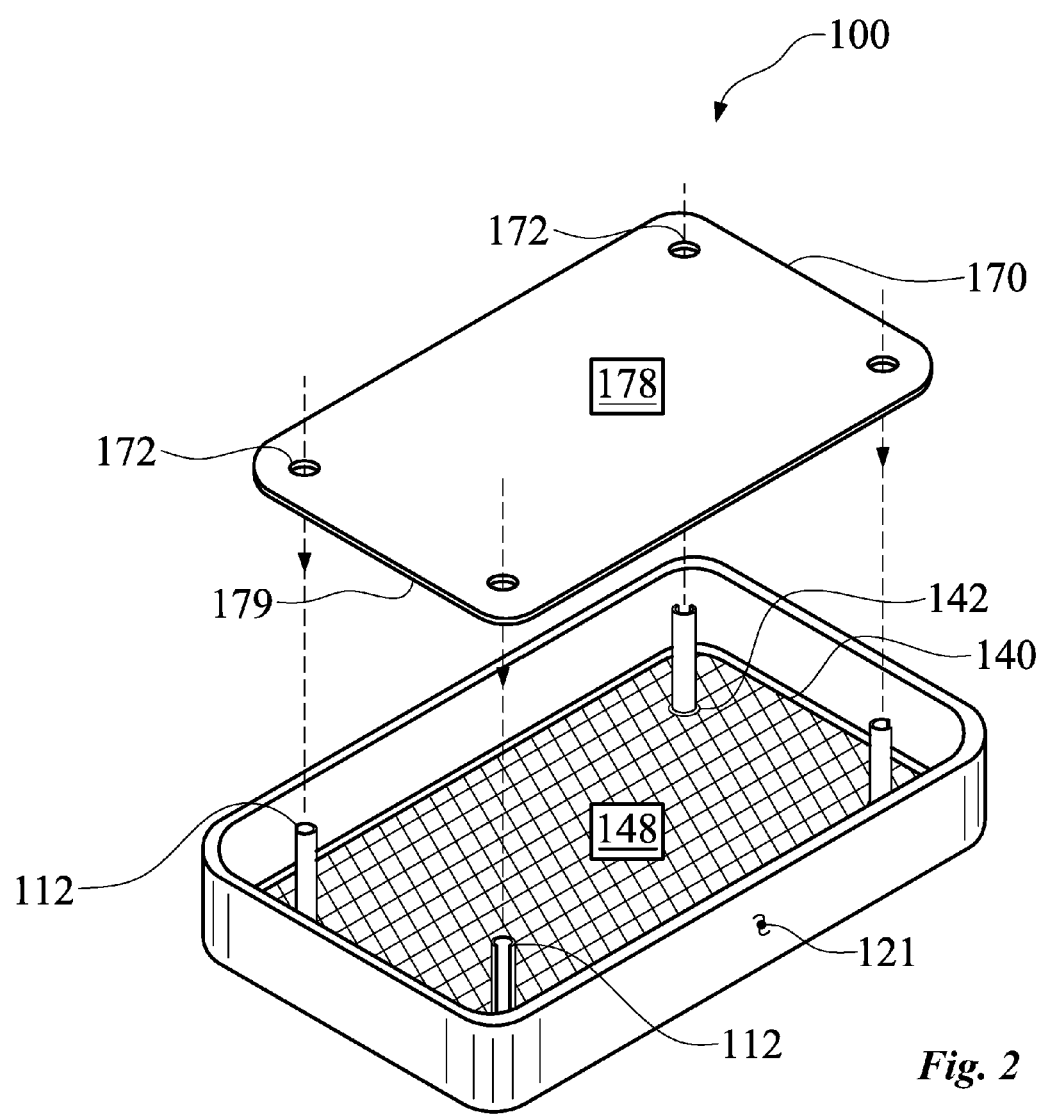
FIG. 2 is an isometric view of an embodiment of the cat litter box cleaning system showing the base and assembly of the first layer, not to scale.

The first sieve (140) and the first liner (170) are assembled in a specific order. As seen in FIG. 2, the first sieve (140) is placed within the base (110) with one first sieve securing receptacle (142) releasably cooperating with one layer securing fixture (112). Once in position, the first sieve bottom surface (149) is adjacent to the base granule contact surface (118). Following a similar assembly procedure, the first liner (170) is inserted into the base (110) with one first liner securing receptacle (172) releasably cooperating with one layer securing fixture (112). When installed, the first liner bottom surface (179) is adjacent to the first sieving surface (148).

The first sieve (140) and the first liner (170) are secured in position by the releasable cooperation of the first sieve securing receptacles (142) and the first liner sieve securing receptacles (172) with the layer securing fixtures (112), thus substantially preventing the cat from dislodging or disturbing the first sieve (140) and the first liner (170) within the base (110). Therefore, the first sieve and liner perimeters (150, 180) are maintained in position adjacent to the wall (121) helping keep the litter granules (10) and waste clumps (20) on the first liner granule contact surface (178). As those skilled in the art will recognize, the layer securing fixtures (112) may be elastic cord, rope, rods, and structure capable of releasably attaching to the first sieve (140) and first liner (170).

Figure 3:
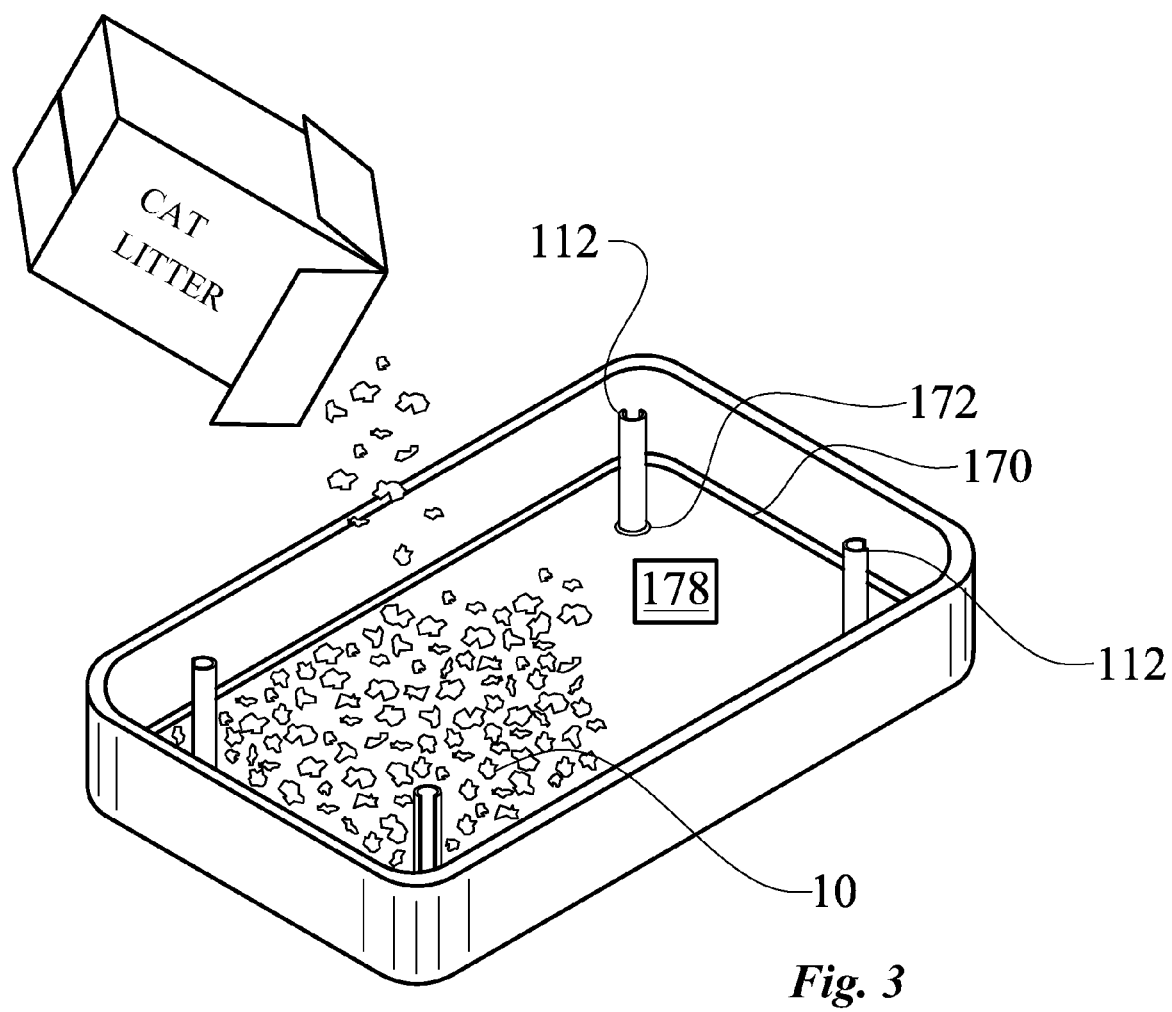
FIG. 3 is an isometric view of an embodiment of the cat litter box cleaning system showing final assembly of the first layer and filling with litter, not to scale.

As seen in FIG. 3, once the first sieve (140) and the first liner (170) are secured into position, the litter granules (10) are added onto the first liner granule contact surface (178). The litter granules (10) may form a layer of litter between approximately one and approximately four inches deep. If the cat were to dig through the litter granules (10) to the first liner granule contact surface (178) then the cat would be unable to dislodge the first liner (170) or the first sieve (140).

Figure 4:
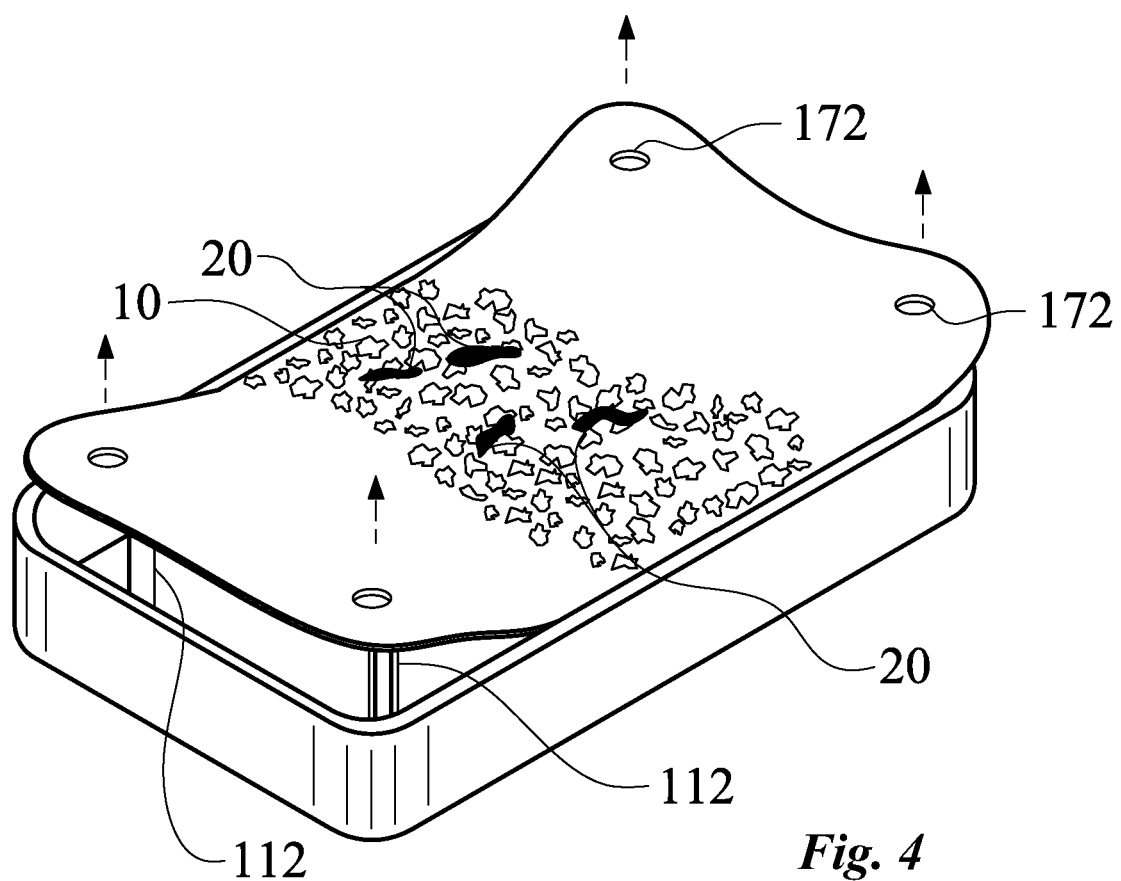
FIG. 4 is an isometric view of an embodiment of the cat litter box cleaning system showing withdrawal of a first liner with litter granules and waste clumps, not to scale.
Figure 5:
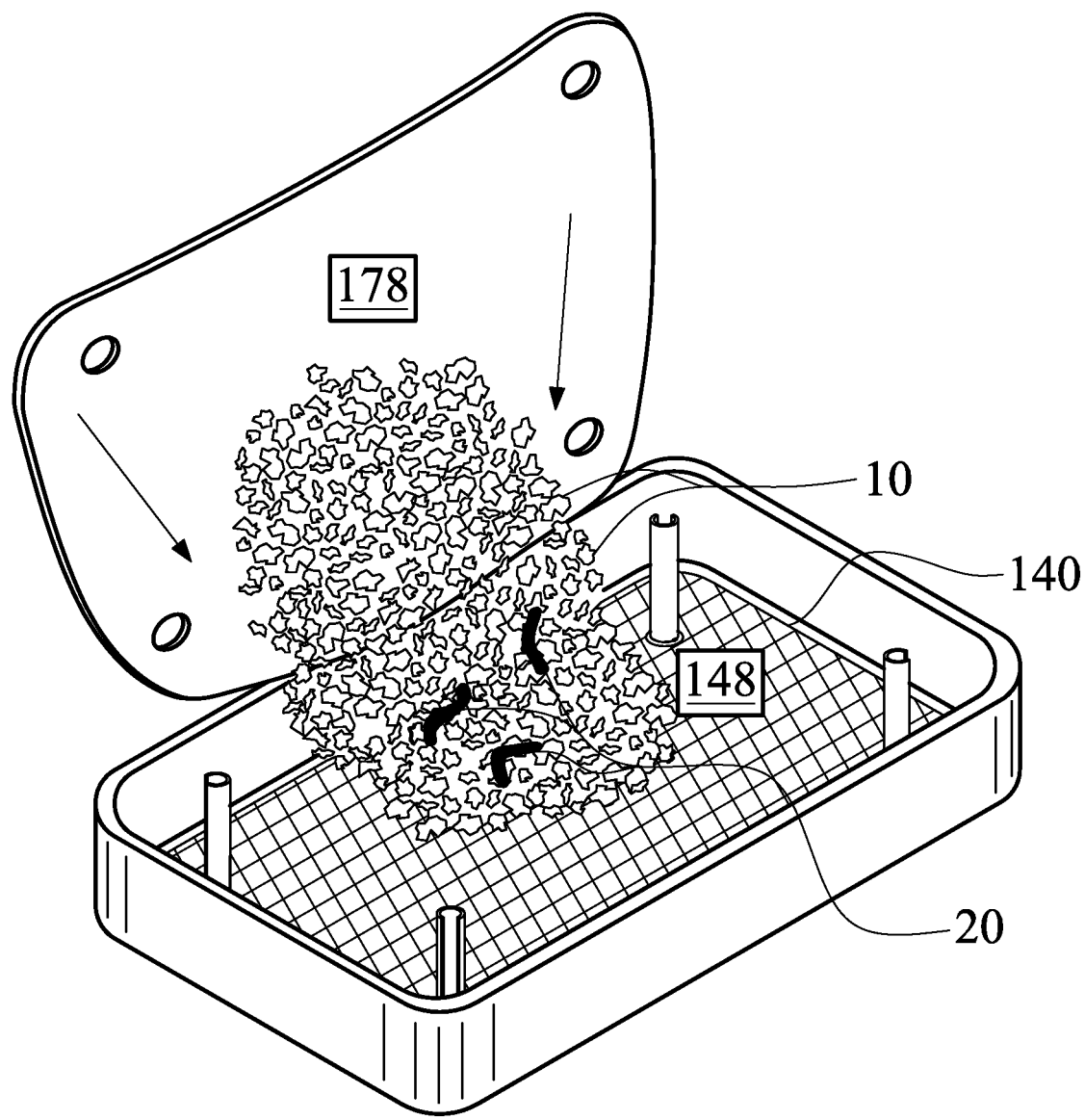
FIG. 5 is an isometric view of an embodiment of the cat litter box cleaning system showing the dumping of the litter granules and waste clumps onto a first sieve, not to scale.
Figure 6:
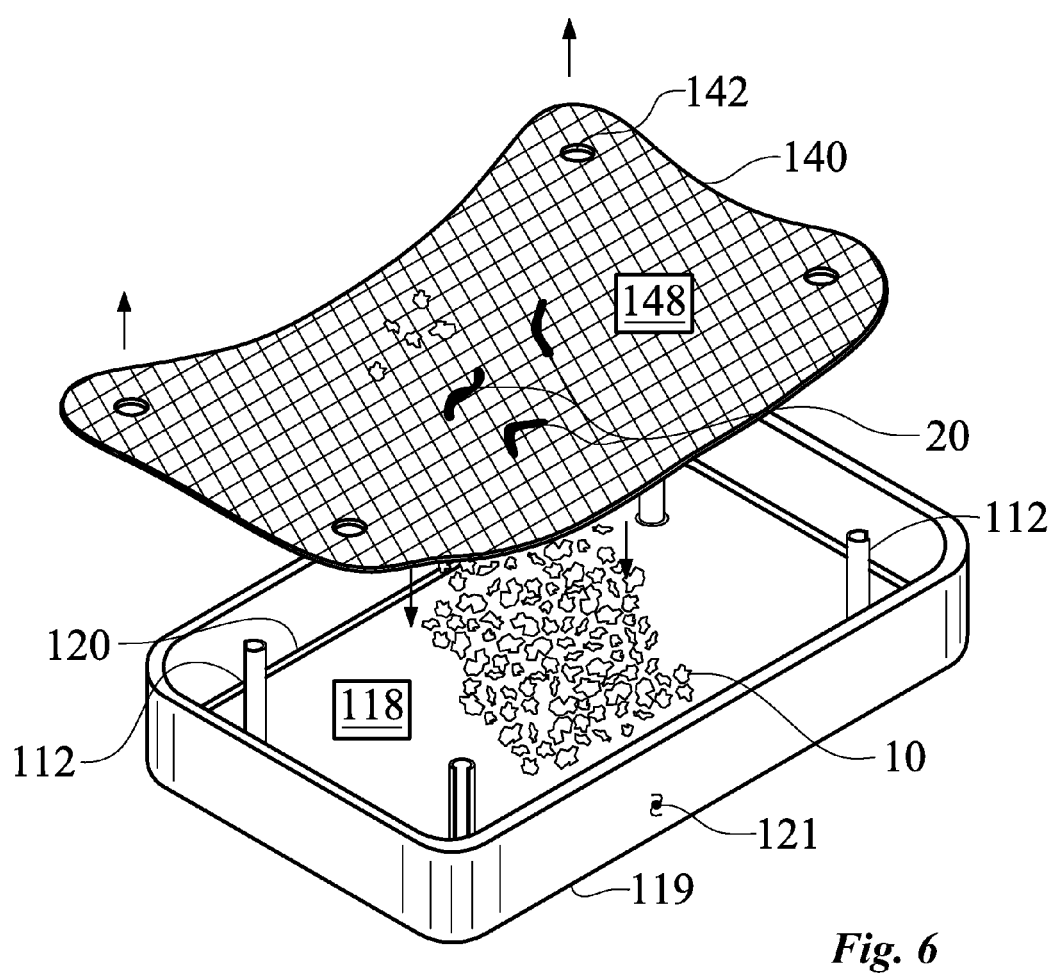
FIG. 6 is an isometric view of an embodiment of the cat litter box cleaning system showing withdrawal of the first sieve with the waste clumps retained on the first sieve, not to scale.

The cat will eventually eliminate in the layer of litter. The litter granules (10) will adhere to the waste forming the waste clumps (20). At some point, the owner will clean the litter granules (10) by removing the waste clumps (20). In an embodiment of the cat litter box cleaning system (100) having the first layer, as seen in FIG. 4, the owner will first disconnect the first liner (170) from the layer securing fixtures (112). The owner will then dump the litter, including the waste clumps (20), from the first liner (170) onto the first sieving surface (148), as seen in FIG. 5. The owner removes the first liner (170) for disposal or storage, as will be discussed below. As seen in FIG. 6, the first sieve securing receptacles (142) are released from the layer securing fixtures (112) while the litter granules (10) and the waste clumps (20) are on the first sieving surface (148). By lifting the first sieve (140) from the base (110), the litter granules (10) pass through the first sieve (140) and onto the granule contact surface (118), but the first sieve (140) captures the waste clumps (20) on the first sieving surface (148). The owner can then dispose of the waste clumps (20).

Figure 7:
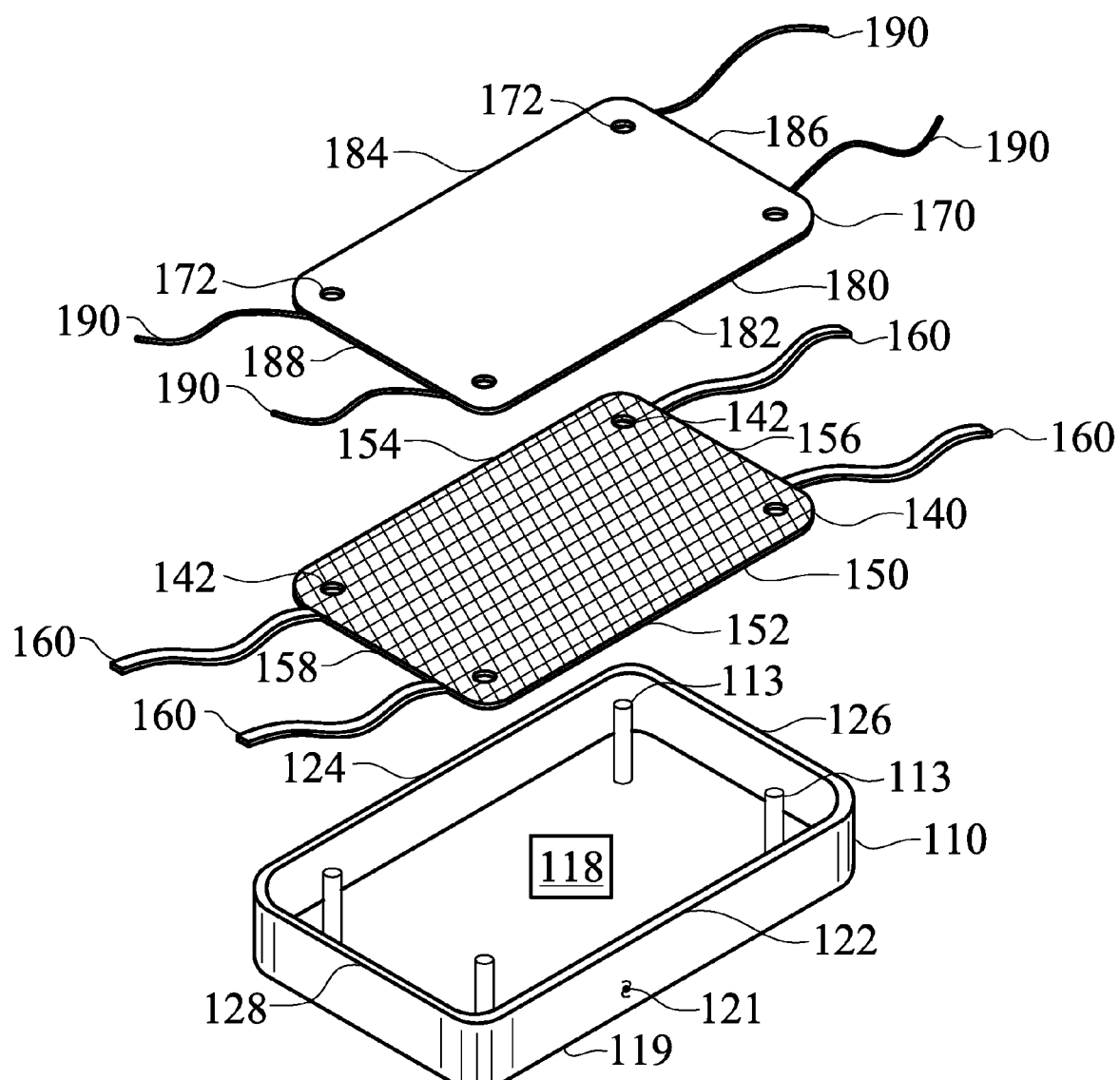
FIG. 7 is an isometric view of an embodiment of the cat litter box cleaning system with a plurality of first sieve and first liner gripping extensions, not to scale.
Figure 8:
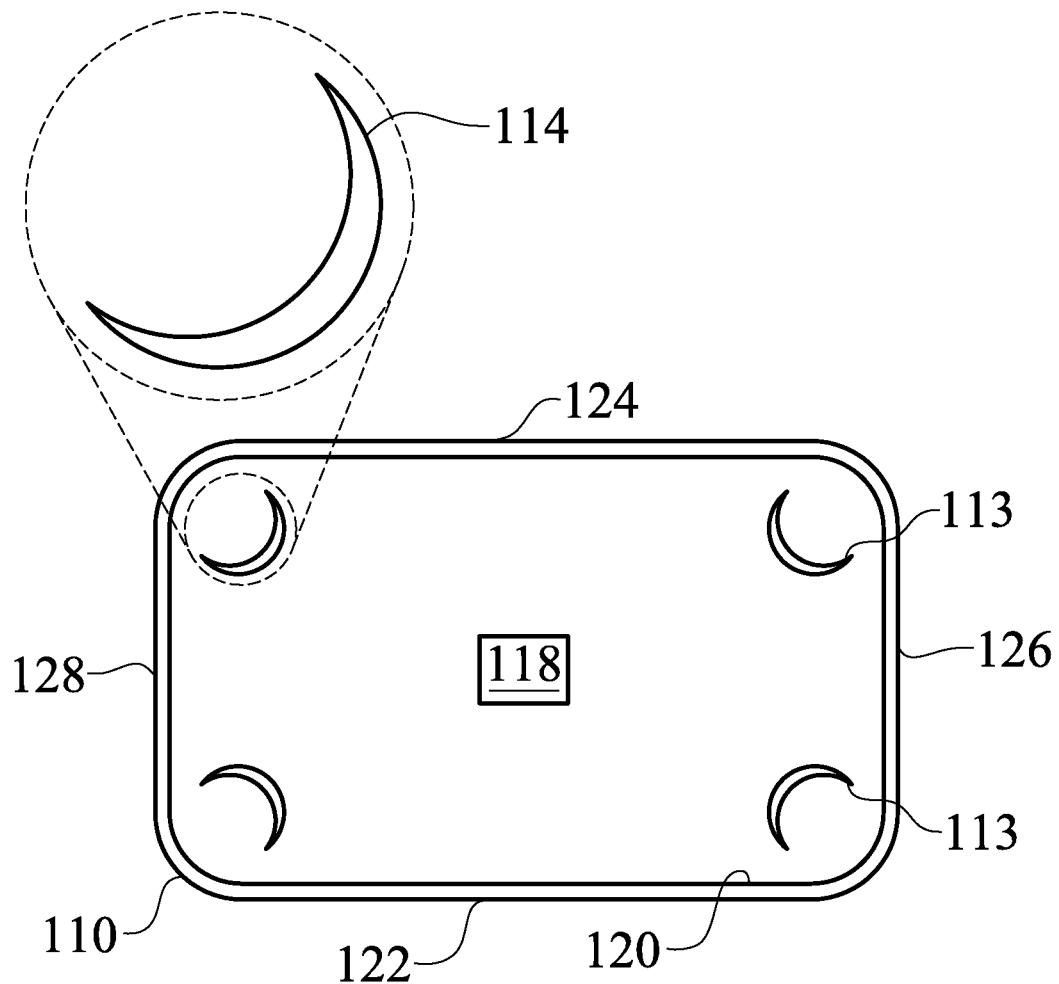
FIG. 8 is a top plan view of an embodiment of the cat litter box cleaning system with crescent shaped layer securing fixtures, not to scale.

In another embodiment, as seen in FIGS. 7 and 8, the layer securing fixtures (112) are posts (113) having a securing fixture height (116) and a cross section (114). The posts (113) are attached to the granule contact surface (118) within the base perimeter (120) and may extend substantially perpendicular to the granule contact surface (118). The securing fixture height (116) may be less than, greater than, or equal to the wall height (129). Preferably, the securing fixture height (116) is at least high enough to extend out of the litter granules (10), such as about 4 to 5 inches. The posts (113) may be solid or hollow.

Figure 8A:
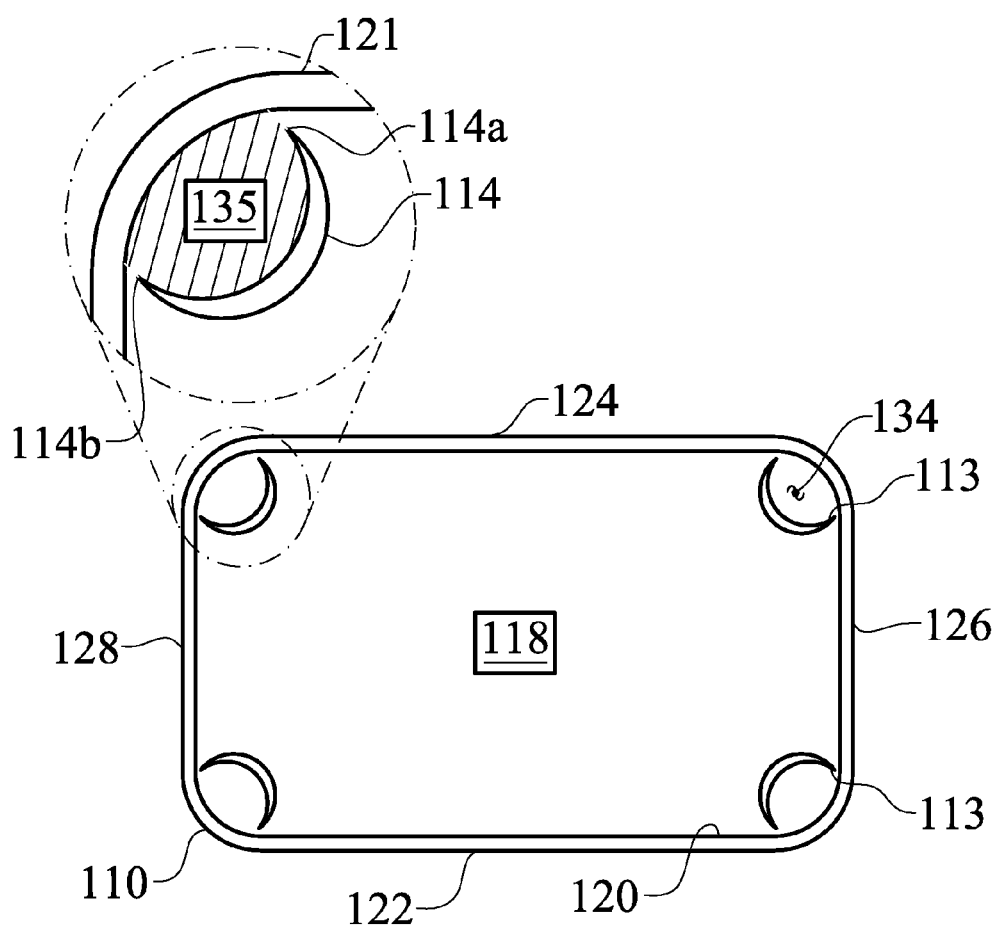
FIG. 8a is a top plan view of an embodiment of the cat litter box cleaning system with crescent shaped layer securing fixtures, not to scale.
Figure 8B:
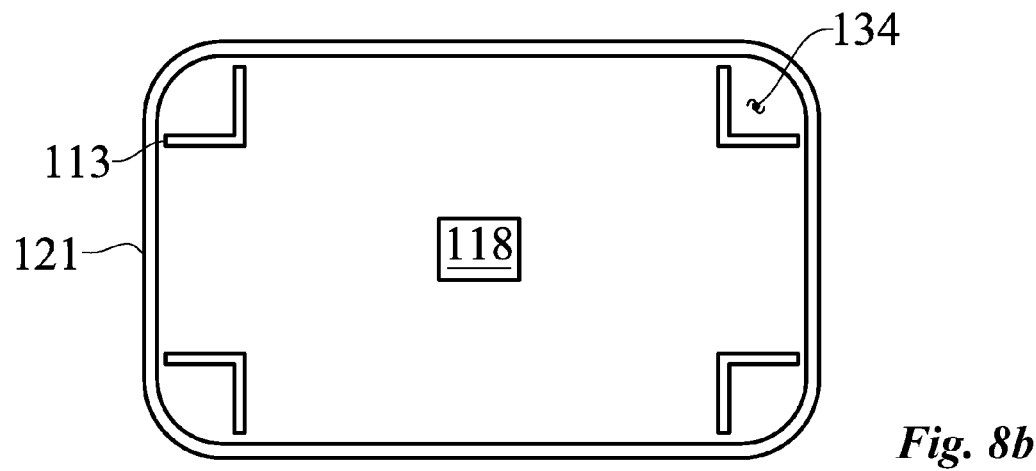
FIG. 8b is a top plan view of an embodiment of the cat litter box cleaning system, not to scale.
Figure 8C:
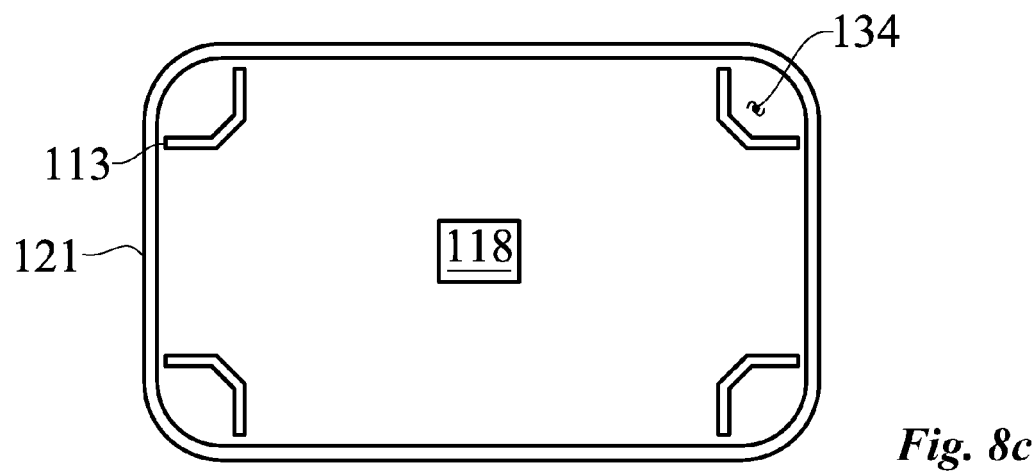
FIG. 8c is a top plan view of an embodiment of the cat litter box cleaning system, not to scale.

In a particular embodiment, as seen in FIGS. 8a-8c, the posts (113) are spaced from portions of the wall (121) nearest each post (113) by less than about ¼ inch. Thus, when a post (113) is positioned near a corner of the wall (121), the post (113) will likely be closer to the portions of the wall (121) that form the corner (i.e., the sidewalls), rather than the corner itself. As such, the post (113) will be spaced less than about ¼ inch from portions of the sidewalls forming the corner, but may be spaced further than ¼ inch from the corner itself. Moreover, the posts (113) and the wall (121) may be configured to create an access port (134), as seen in FIGS. 8a-8c, such that an owner may easily grasp a portion of a layer without having to come into contact with the litter granules (10). Additionally, the posts (113) may be shaped and spaced from the wall (121) such that the access port (134) is defined by a partially bounded area (135) between about 0.6 square inches to about 1.5 square inches, as seen well in FIG. 8a. The configuration of the posts (113) and their spacing from the wall (121) allows a portion of the sieve (140) or liner (170) to pass between the wall (121) and the posts (113) and into the access port (134). Furthermore, the spacing between the posts (113) and the wall (121) helps prevent the litter granules (10) from entering into the access port (134). With a portion of the sieve (140) or liner (170) within the access port (134) and free of litter granules (10), an owner may easily grasp a portion of the sieve (140) or liner (170) and remove the sieve (140) or liner (170) from the posts (113) without contacting the litter granules (10). It is preferable that the cross section (114) includes a concave portion having a first terminating end (114a) and a second terminating end (114b), such as the crescent shaped posts (113) seen in FIG. 8a, to create an access port (134) along any portion of the wall (121), not just corners. However, the concave portion does not necessarily have to be rounded; for example, an L-shaped post (113) could be used, as seen in FIG. 8b. The concave portion ensures a shape that cooperates with a human fingertip when a layer is removed. The first and second terminating ends (114a, 114b) of the posts (113) are preferably spaced less than about ¼ inch from the wall (121).

Figure 8D:
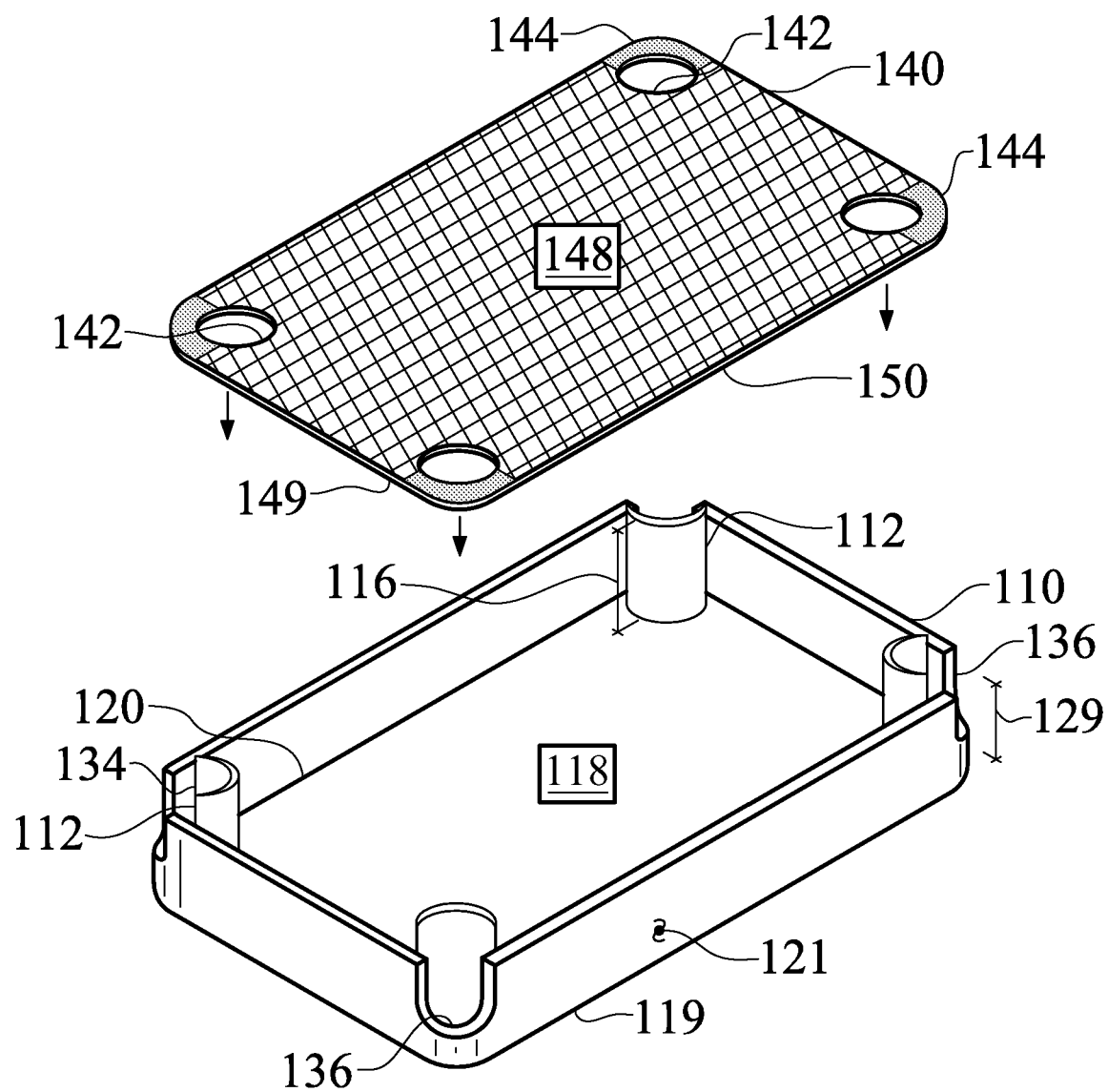
FIG. 8d is an isometric view of an embodiment of the cat litter cleaning system showing an embodiment of the base and a first layer, not to scale.

In another embodiment, seen in FIG. 8d, the wall (121) may include access notches (136) that are adjacent to and align with each post (113). The access notches (136) extend below the top of the wall (121) by a distance that is less than the wall height (129) and may have a U-shaped configuration. In a particular embodiment, the access notches (136) extend below the top of the wall (121) by a distance equal to fifty percent of the wall height (129). By providing access notches (136), the owner has more space to easily grasp a portion of the sieve (140) or liner (170) and remove the sieve (140) or liner (170) from the posts (113) without contacting the litter granules (10).

In yet another embodiment of the cat litter box cleaning system (100), the posts (113) may be "C" shaped. The "C" may be a hollow tube with a longitudinal portion removed to permit insertion of a human finger. During the cleaning process, the owner may reach under the first liner (170) or sieve (140) and insert one of their fingers into an open region of the post (113). In this embodiment then, the first sieve securing receptacle (142) or first liner securing receptacle (172) may be more easily released from, and guided off, the layer securing receptacle (112).

In another embodiment, seen in FIGS. 11, 12, 13, and 14, the posts (113) have a cross section (114) with a rectangular shape and the wall (121) has recesses to accommodate passage of the sieve securing and liner securing receptacles (142, 172) having a rectangular shape between the wall and the post (113). The placement of the posts (113) substantially prevents litter granules (10) from entering into the recess area between the post (113) and the wall (121) thereby making removal of the sieve (140) and the liner (170) easy.

Figure 17:
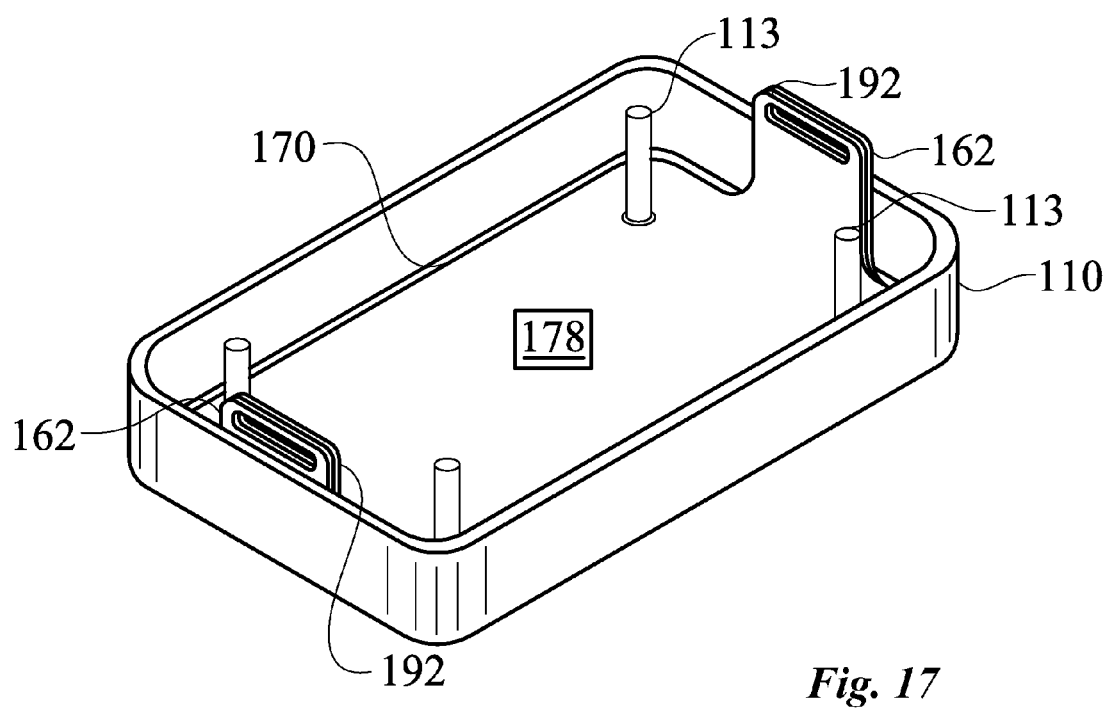
FIG. 17 is an isometric view of an embodiment of the cat litter box cleaning system with liner and sieve gripping extensions, not to scale.

In another embodiment, seen in FIG. 17, the cross section (114) may be substantially round. In other words, the posts (113) may be substantially cylindrical. However, one skilled in the art will observe and appreciate that the cross section (114) may be other shapes and that the cross section (114) need not be uniform along the height of the post (113) but may vary by height above the granule contact surface (118) to accomplish releasable attachment to the first sieve and first liner securing receptacles (142, 172).

In still another embodiment, with reference again to FIGS. 7 and 8, the base perimeter (120) is substantially rectangular and the wall (121) has a proximal side (122), a distal side (124), a dextral side (126), and a sinistral side (128). The base (110) has four layer securing fixtures (112) positioned near each corner of the base perimeter (120). However, as previously mentioned, it is not necessary to have the layer securing fixtures (112) located near each corner. For example, the layer securing fixtures (112) could be located near the midpoint of at least two of the sides (122, 124, 126, 128), or virtually anywhere within the base perimeter (120). Generally, with reference to FIGS. 7 and 8, as one skill in the art will observe and appreciate, in the embodiment with the rectangular base, the first sieve perimeter (150) has four edges, namely: a first sieve proximal edge (152), a first sieve distal edge (154), a first sieve dextral edge (156), and a first sieve sinistral edge (158). In addition, the first sieve (140) has four first sieve securing receptacles (142) that releasably cooperate with the layer securing fixtures (112). Similarly, the first liner perimeter (180) has four edges, namely: a first liner proximal edge (182), a first liner distal edge (184), a first liner dextral edge (186), and a first liner sinistral edge (188). In addition, the first liner (170) has four first liner securing receptacles (172) that releasably cooperate with the layer securing fixtures (112).

Figure 9:
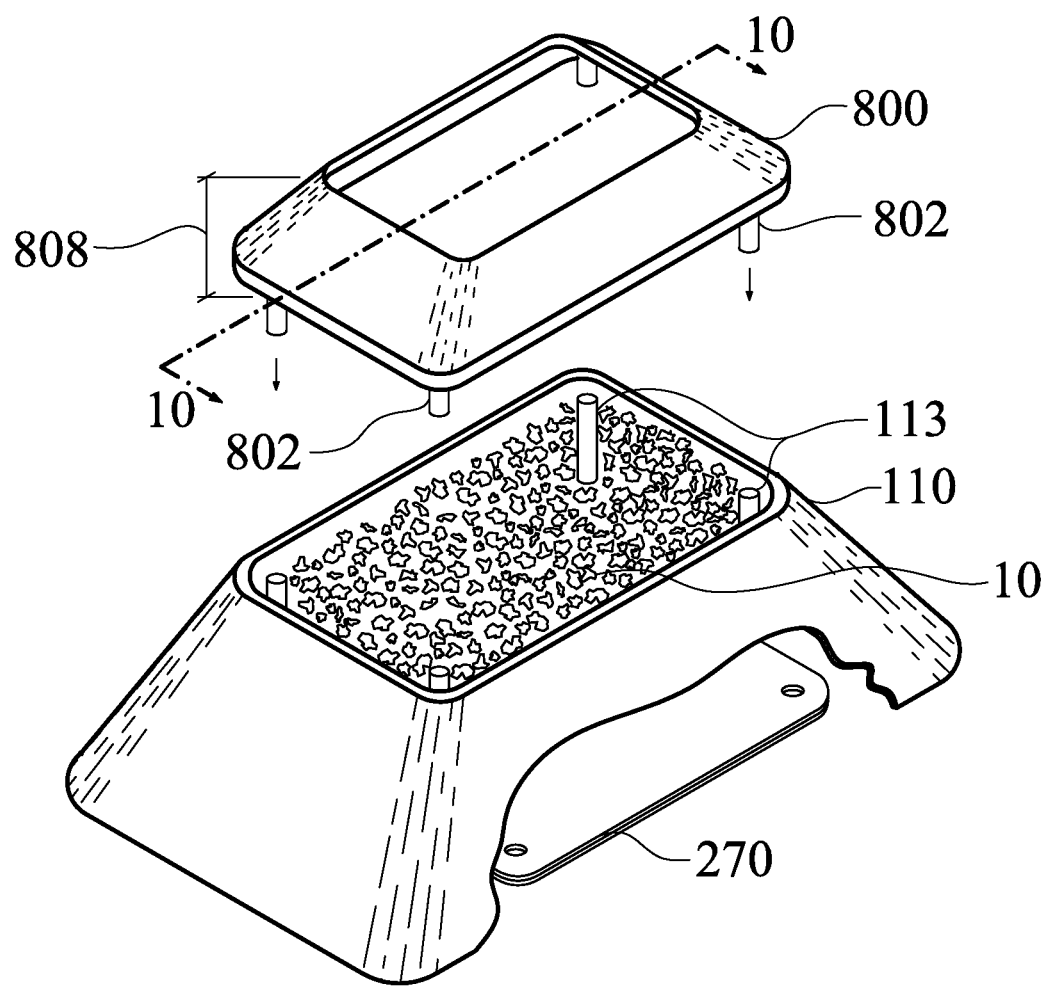
FIG. 9 is an isometric view of an embodiment of the cat litter box cleaning system with a protective rim and a liner storage compartment, not to scale.
Figure 10:
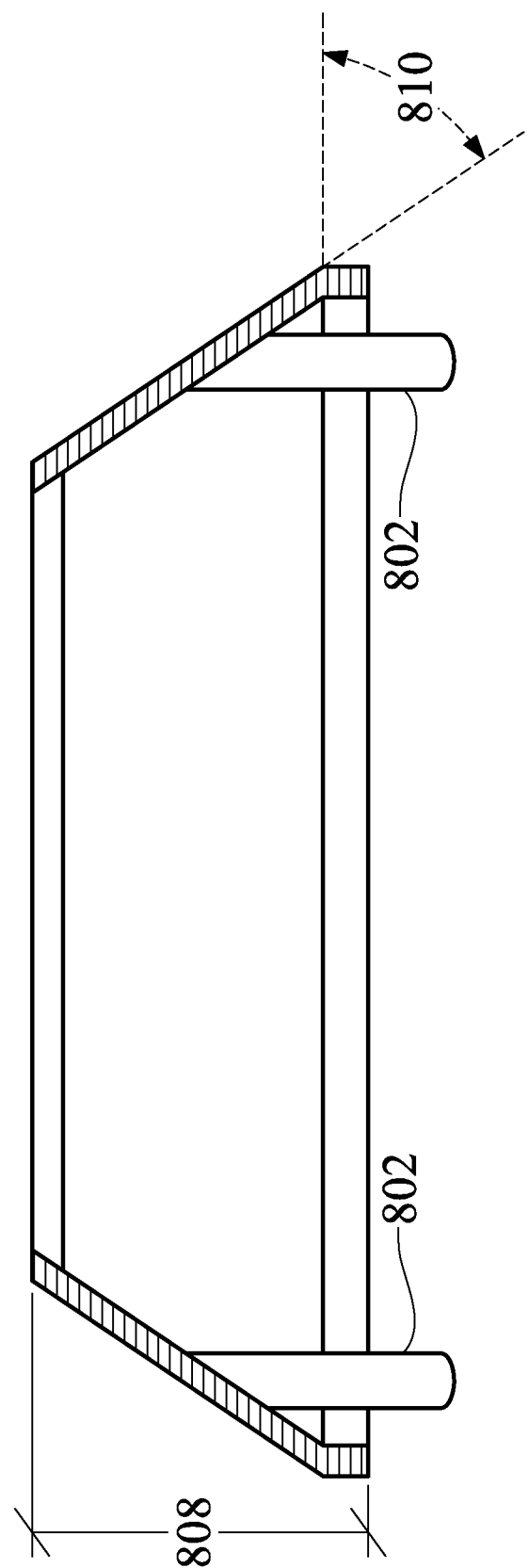
FIG. 10 is a cross-sectional view of the protective rim taken along section line 10-10 in FIG. 9, not to scale.
Figure 11:
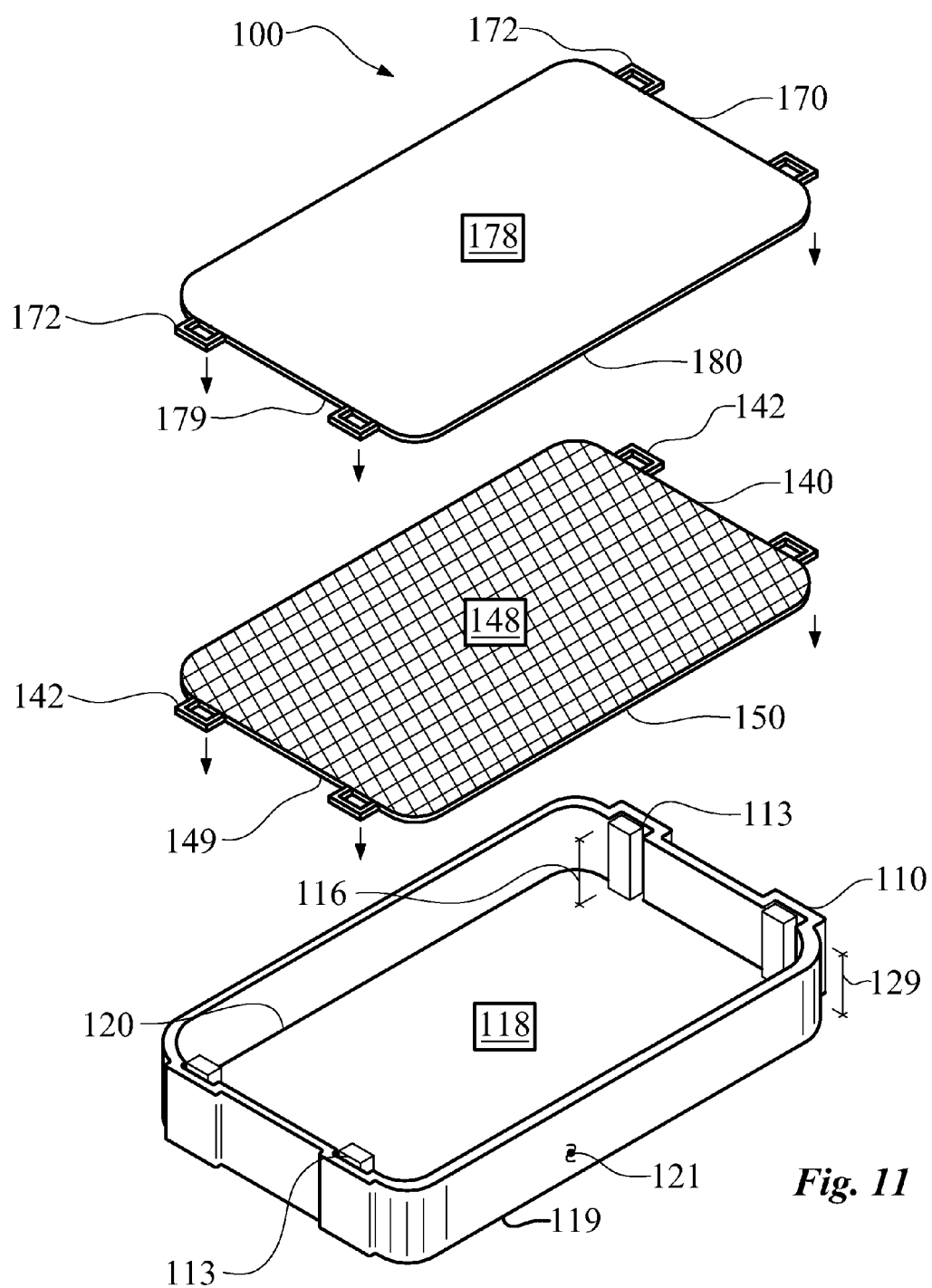
FIG. 11 is an isometric view of an embodiment of the cat litter box cleaning system with rectangular shaped layer securing fixtures and rectangular shaped first sieve securing receptacles and rectangular shaped first liner securing receptacles, not to scale.
Figure 12:
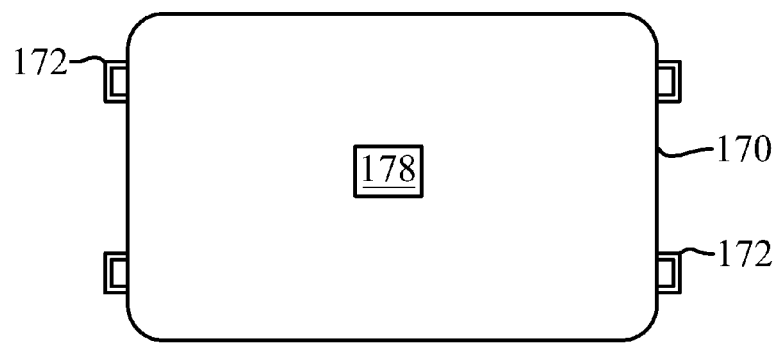
FIG. 12 is a top plan view of an embodiment of a liner with rectangular shaped liner securing receptacles, not to scale.
Figure 13:
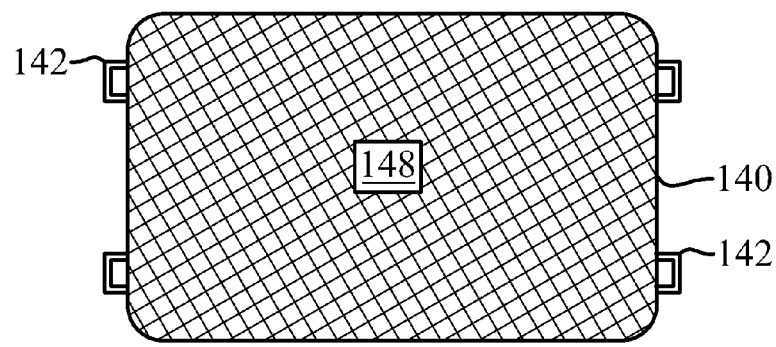
FIG. 13 is a top plan view of an embodiment of a sieve with rectangular shaped sieve securing receptacles, not to scale.
Figure 14:
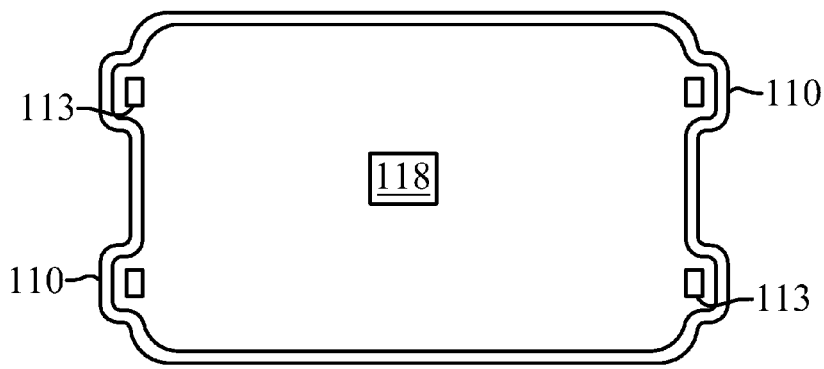
FIG. 14 is a top plan view of an embodiment of a base with rectangular shaped layer securing fixtures; not to scale.

In another embodiment, the cat litter box cleaning system (100) includes a protective rim (800). As seen in FIG. 9, if the cat decides to dig into the litter, the protective rim (800) helps keep the litter granules (10) confined within the base (110). The protective rim (800) has at least two rim securing receptacles (802), a rim height (808) and a rim angle (810). The position of the rim securing receptacles (802) positions the protective rim (800) over the litter. The protective rim (800) extends from the top of the wall (121) toward the middle of the base (110) at the rim angle (810), as seen in FIG. 10, so that the protective rim (800) slants away from the granule contact surface (118) or in an upward direction. The rim angle (810) is measured between a line coincident in the protective rim (800) and a plane parallel with the granule contact surface (118). As one skilled in the art will appreciate, the rim angle (810) may be varied to improve the efficiency of the protective rim (800) in knocking down litter granules (10) that become airborne while the cat is using the cat litter box cleaning system (100).

In one embodiment, as seen in FIG. 9, the number of the rim securing receptacles (802) equals the number the layer securing fixtures (112). The rim securing receptacles (802) releasably cooperate with the layer securing fixtures (112). In addition to helping keep the surrounding area free of spilled litter granules (10), once in position, the protective rim (800) may also keep the first sieve (140) and the first liner (170) confined within the base (110) by capping the layer securing fixture (112). In one embodiment, the rim height (808) is between approximately three and approximately six inches and the rim angle (810) is between approximately zero and approximately eighty-nine degrees with respect to the granule contact surface (118).

Figure 15:
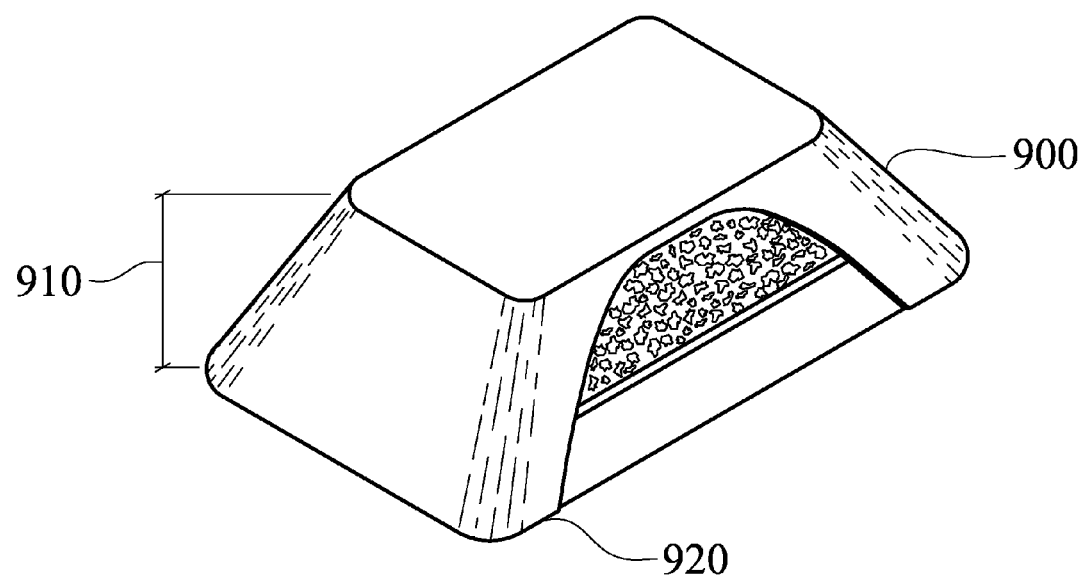
FIG. 15 is an isometric view of an embodiment of the cat litter box cleaning system with a storage cover, not to scale.

In another embodiment, as seen in FIG. 15, the cat litter box cleaning system (100) includes a storage cover (900). The storage cover (900) is designed to at least keep the litter granules (10), and any waste clumps (20), hidden from view. If the cat litter box cleaning system (100) is located in an area where it might be easily seen when the owner has guests in their home, the owner may feel that it is necessary to cover the waste clumps (20) to hide their unsightly appearance or retard the escape of any pungent odor. Rather than move the system (100) to another out-of-the-way location, the owner can put on the storage cover (900). The storage cover (900) has a storage cover height (910) and a storage cover support edge (920). In one embodiment, the storage cover (900) may completely enclose the base (110). In this embodiment, the storage cover height (910) may be greater than the securing fixture height (116) plus the rim height (808) plus room for the cat, and the storage cover support edge (920) fits around, or encircles, the base (110); however, the storage cover (900) may have an opening which the cat may use to enter and leave the base (110). The storage cover (900) may have any shape, may include a handle, and may be made from many different materials. In one embodiment, the storage cover (900) is placed over the base (110) and remains in position solely by gravity. The storage cover (900) may contact other portions of the cat litter box cleaning system (100), but contact is not necessary. In another embodiment, the storage cover (900) releasably contacts the protective rim (800) or the wall (121) preventing visibility of the litter granules (10) and the waste clumps (20).

Figure 16:
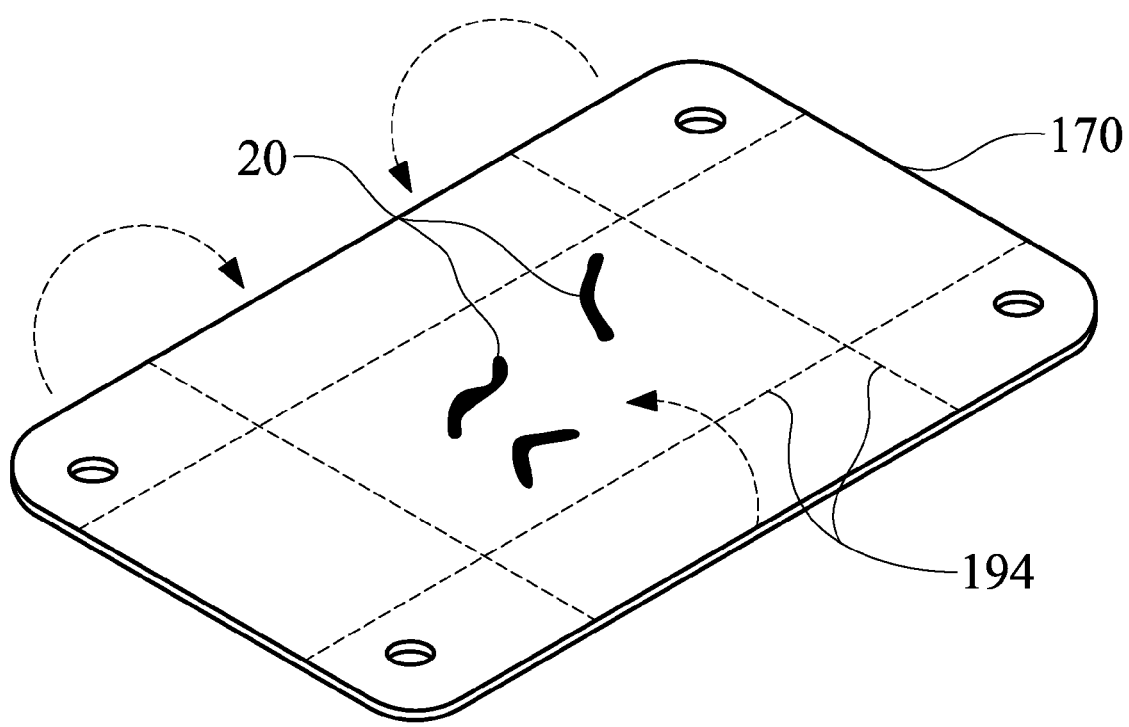
FIG. 16 is an isometric view of a disposable liner with fold lines, not to scale.

As seen in FIG. 16, in yet another embodiment, the first liner (170) is disposable and has a plurality of first fold lines (194). The first liner (170) may be crushed or folded to prevent any cat waste from contacting and contaminating other surfaces. The fold lines (194) may provide a predicable, repeatable method of folding for hygienically disposing of the soiled liner (170) and the waste clumps (20). By folding the first liner (170) along the fold lines (194) the owner may prevent feces or urine from contacting their clothes, hands, or other surrounding surface. In addition, after removing the waste clumps (20) from the litter granules (10) with one of the sieves (140), the captured waste clumps (20) and the soiled first sieve (140) may be placed onto the first liner (170) so that all of the soiled materials and the waste clumps (20) are disposed of easily and cleanly. The fold lines (194) may include one or more die cuts, perforations, indentations, score lines, and weakened fold lines to ease folding the first liner (170) for disposal.

Referring now to FIG. 7, in yet another embodiment of the cat litter box cleaning system (100) for making the removal of the first layer easy and convenient, the first sieve (140) has a first sieve gripping extension (160) and the first liner (170) has a first liner gripping extension (190). The sieve gripping and liner gripping extensions (160, 190) are attached to the sieve and liner perimeters (150, 180). When the first sieve (140) and first liner (170) are installed, the sieve gripping and liner gripping extensions (160, 190) extend upwards along the wall (121) out of the litter granules (10) on opposing sides of the base (110). Moreover, sieve gripping and liner gripping extensions (160, 190) may be placed within the access port (134) so that the owner may easily grasp the gripping extensions (160, 190) without contacting the litter granules (10). The gripping extensions (160, 190) may be an extension of the first liner (170) or first sieve (140) material or the gripping extensions (160, 190) may be wire, fibers, or other materials attached to the first sieve (140) or first liner (170). The gripping extensions (160, 190) may extend from multiple directions and may be coded or identified by color, number, or lettering to differentiate between the first sieve (140) and the liner (170) when the first layer is hidden from view beneath the litter granules (10). As seen in FIG. 17, in another embodiment, the first sieve gripping extensions (160) are sieve gripping extension tabs (162), and the first liner gripping extensions (190) are liner gripping extension tabs (192). To further ease sieve (140) and liner (170) removal, the first liner and first sieve gripping extension tabs (162, 192) may extend from two opposing sides of the first sieve and first liner (140, 170). Alternatively, the first sieve (140) and first liner (170) may have reinforced areas that allow the owner to easily grasp a portion of the first sieve (140) and first liner (170). For example, as seen in FIG. 8d, each corner of the sieve (140) includes a reinforced area (144) that allows each corner of the sieve (140) to be grasped more easily. The reinforced area (144) may be formed of plastic, metal, or other materials. Preferably, the reinforced areas are positioned on the sieves and liners adjacent to the sieve securing receptacles and the liner securing receptacles.

Figure 18:
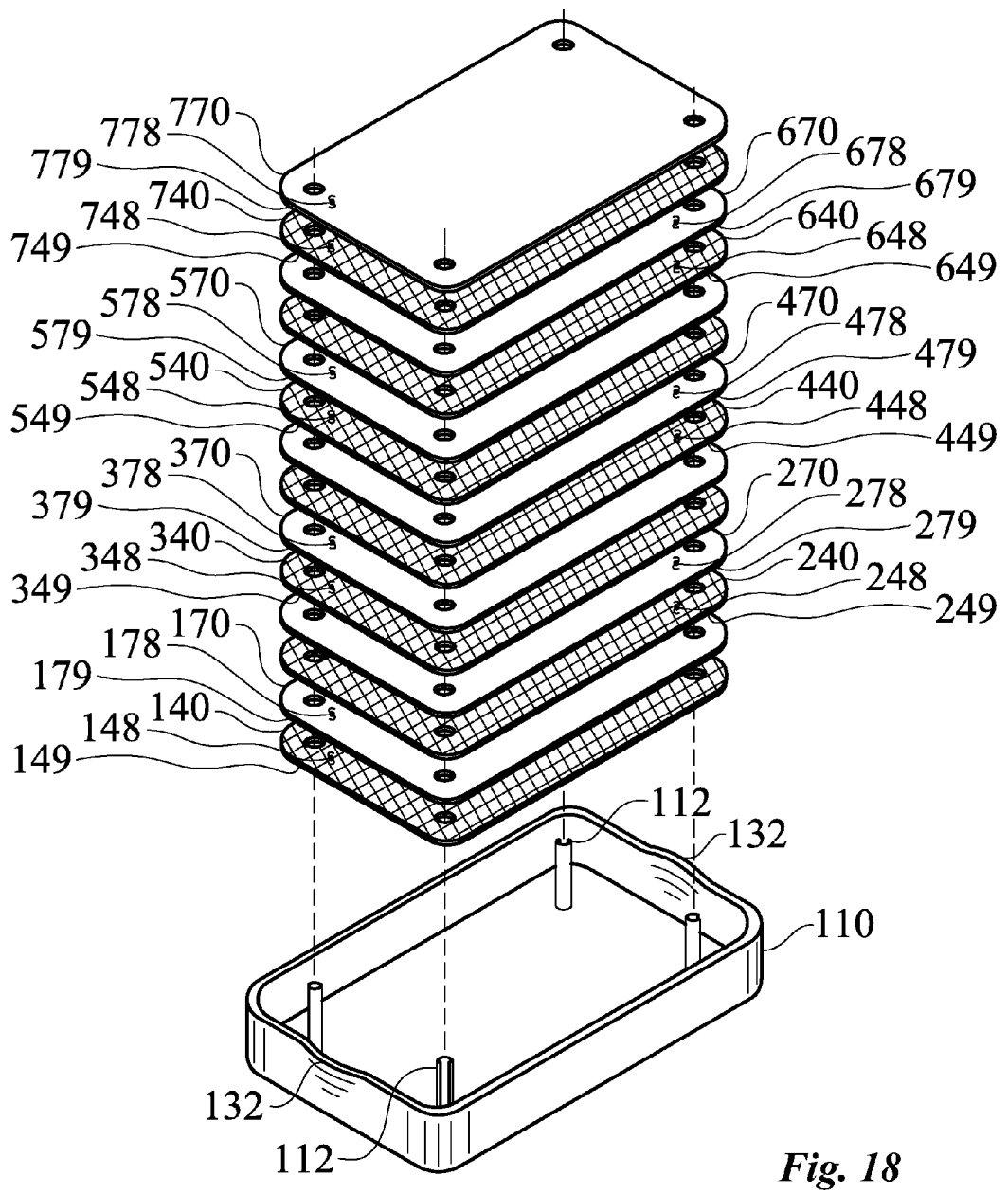
FIG. 18 is an isometric view of an embodiment of the cat litter box cleaning system showing seven layers of liners and sieves, not to scale.
Figure 19:
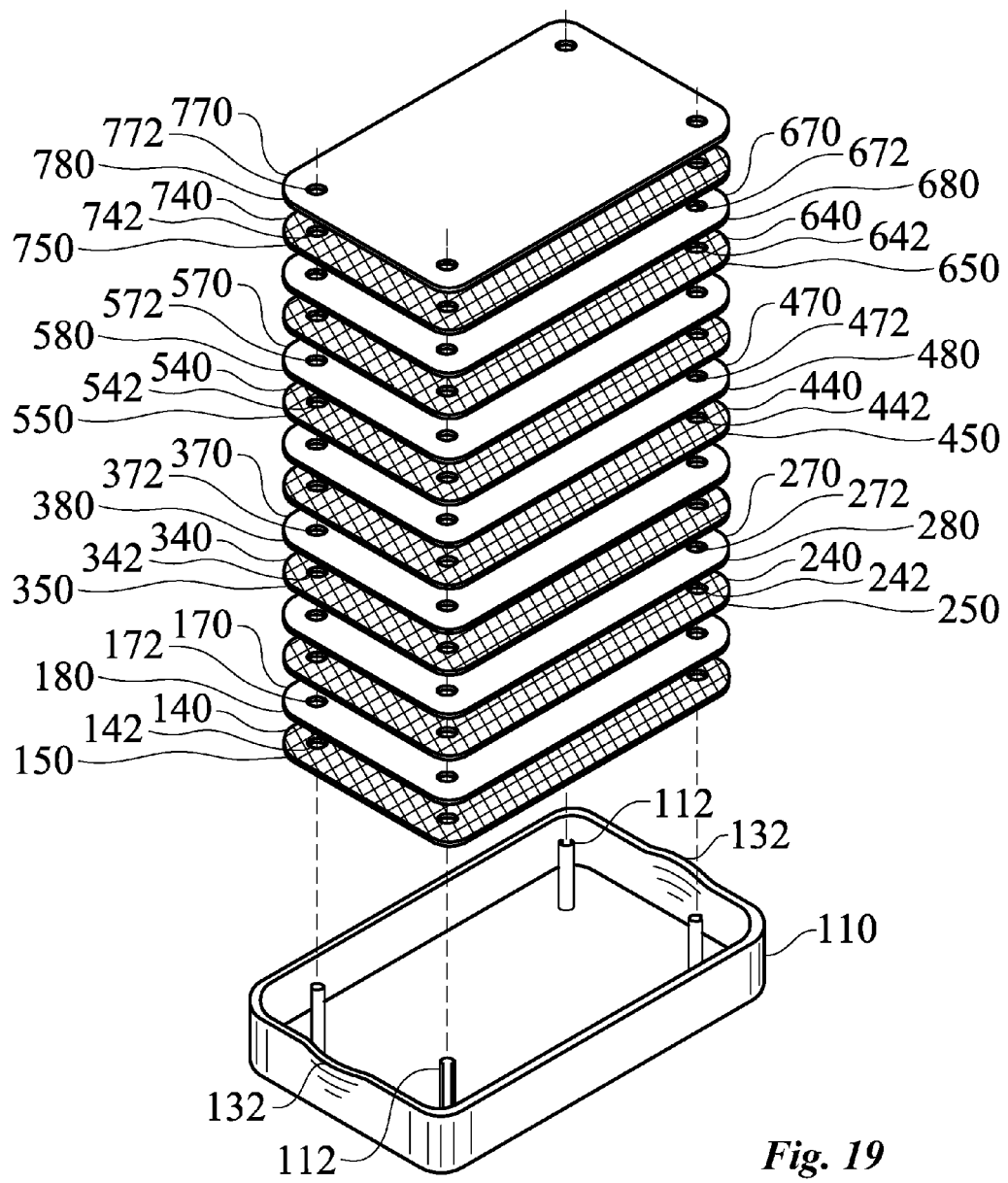
FIG. 19 is an isometric view of an embodiment of the cat litter box cleaning system showing seven layers of liners and sieves, not to scale.

In another embodiment, as seen in FIGS. 18 and 19, the cat litter box cleaning system (100) includes multiple layers. That is, a second layer, a third layer, a fourth layer, a fifth layer, a sixth layer, and a seventh layer, in addition to the first layer, collectively referred to the "layers." As one skilled in the art will recognize, the second, third, fourth, fifth, sixth, and seventh layers may be substantially similar to the first layer, described above. Now, each of the layers will be described in complete detail.

With reference generally to FIGS. 18 and 19, the second layer has a second sieve (240) and a second liner (270). The second sieve (240) has at least two second sieve securing receptacles (242). The second sieve (240) also has a second sieving surface (248), a second sieve bottom surface (249), and a second sieve perimeter (250). The second sieve perimeter (250) is substantially the same as the base perimeter (120). When the second sieve (240) is positioned within the base (110), the second sieve bottom surface (249) is adjacent to the first liner granule contact surface (178). The second sieve securing receptacles (242) releasably cooperate with layer securing fixtures (112).

With continued reference to FIGS. 18 and 19, the second liner (270) has at least two second liner securing receptacles (272). The second liner securing receptacles (272) releasably cooperate with the layer securing fixtures (112). The second liner (270) has a second granule contact surface (278), a second liner bottom surface (279), and a second liner perimeter (280). The second liner perimeter (280) is substantially the same as the base perimeter (120). When the second liner (270) is positioned within the base (110), the second liner bottom surface (279) is adjacent to the second sieving surface (248).

The third layer has a third sieve (340) and a third liner (370), as seen in FIGS. 18 and 19. The third sieve (340) has at least two third sieve securing receptacles (342). The third sieve securing receptacles (342) releasably cooperate with the layer securing fixtures (112). The third sieve (340) has a third sieving surface (348), a third sieve bottom surface (349), and a third sieve perimeter (350). The third sieve perimeter (350) is substantially the same as the base perimeter (120). When the third sieve (370) is positioned within the base (110), the third sieve bottom surface (349) is adjacent to the second liner granule contact surface (278).

With continued reference to FIGS. 18 and 19, the third liner (370) has at least two third liner securing receptacles (372). The third liner securing receptacles releasably cooperate with the layer securing fixtures (112). The third liner (370) has a third granule contact surface (378), a third liner bottom surface (379), and a third liner perimeter (380). The third liner perimeter (380) is substantially the same as the base perimeter (120). When the third liner (370) is positioned within the base (110), the third liner bottom surface (379) is adjacent to the third sieving surface (348).

The fourth layer has a fourth sieve (440) and a fourth liner (470), as seen in FIGS. 18 and 19. The fourth sieve (440) has at least two fourth sieve securing receptacles (442). The fourth sieve securing receptacles (442) releasably cooperate with the layer securing fixtures (112). The fourth sieve (440) has a fourth sieving surface (448), a fourth sieve bottom surface (449), and a fourth sieve perimeter (450). The fourth sieve perimeter (450) is substantially the same as the base perimeter (120). When the fourth sieve (470) is positioned within the base (110), the fourth sieve bottom surface (449) is adjacent to the third liner granule contact surface (378).

With continued reference to FIGS. 18 and 19, the fourth liner (470) has at least two fourth liner securing receptacles (472). The fourth liner securing receptacles releasably cooperate with the layer securing fixtures (112). The fourth liner (470) has a fourth granule contact surface (478), a fourth liner bottom surface (479), and a fourth liner perimeter (480). The fourth liner perimeter (480) is substantially the same as the base perimeter (120). When the fourth liner (470) is positioned within the base (110), the fourth liner bottom surface (479) is adjacent to the fourth sieving surface (448).

The fifth layer has a fifth sieve (540) and a fifth liner (570), as seen in FIGS. 18 and 19. The fifth sieve (540) has at least two fifth sieve securing receptacles (542). The fifth sieve securing receptacles (542) releasably cooperate with the layer securing fixtures (112). The fifth sieve (540) has a fifth sieving surface (548), a fifth sieve bottom surface (549), and a fifth sieve perimeter (550). The fifth sieve perimeter (550) is substantially the same as the base perimeter (120). When the fifth sieve (570) is positioned within the base (110), the fifth sieve bottom surface (549) is adjacent to the fourth liner granule contact surface (478).

With continued reference to FIGS. 18 and 19, the fifth liner (570) has at least two fifth liner securing receptacles (572). The fifth liner securing receptacles (542) releasably cooperate with the layer securing fixtures (112). The fifth liner (570) has a fifth granule contact surface (578), a fifth liner bottom surface (579), and a fifth liner perimeter (580). The fifth liner perimeter (580) is substantially the same as the base perimeter (120). When the fifth liner (570) is positioned within the base (110), the fifth liner bottom surface (579) is adjacent to the fifth sieving surface (448).

The sixth layer has a sixth sieve (640) and a sixth liner (670), as seen in FIGS. 18 and 19. The sixth sieve (640) has at least two sixth sieve securing receptacles (642). The sixth sieve securing receptacles (642) releasably cooperate with the layer securing fixtures (112). The sixth sieve (640) has a sixth sieving surface (648), a sixth sieve bottom surface (649), and a sixth sieve perimeter (650). The sixth sieve perimeter (650) is substantially the same as the base perimeter (120). When the sixth sieve (670) is positioned within the base (110), the sixth sieve bottom surface (649) is adjacent to the fifth liner granule contact surface (578).

With continued reference to FIGS. 18 and 19, the sixth liner (670) has at least two sixth liner securing receptacles (672). The sixth liner securing receptacles (642) releasably cooperate with the layer securing fixtures (112). The sixth liner (670) has a sixth granule contact surface (678), a sixth liner bottom surface (679), and a sixth liner perimeter (680). The sixth liner perimeter (680) is substantially the same as the base perimeter (120). When the sixth liner (670) is positioned within the base (110), the sixth liner bottom surface (679) is adjacent to the sixth sieving surface (648).

The seventh layer has a seventh sieve (640) and a seventh liner (670), as seen in FIGS. 18 and 19. The seventh sieve (740) has at least two seventh sieve securing receptacles (742). The seventh sieve securing receptacles (742) releasably cooperate with the layer securing fixtures (112). The seventh sieve (740) has a seventh sieving surface (748), a seventh sieve bottom surface (749), and a seventh sieve perimeter (750). The seventh sieve perimeter (750) is substantially the same as the base perimeter (120). When the seventh sieve (770) is positioned within the base (110), the seventh sieve bottom surface (749) is adjacent to the sixth liner granule contact surface (678).

With continued reference to FIGS. 18 and 19, the seventh liner (770) has at least two seventh liner securing receptacles (772). The seventh liner securing receptacles (742) releasably cooperate with the layer securing fixtures (112). The seventh liner (770) has a seventh granule contact surface (778), a seventh liner bottom surface (779), and a seventh liner perimeter (780). The seventh liner perimeter (780) is substantially the same as the base perimeter (120). When the seventh liner (770) is positioned within the base (110), the seventh liner bottom surface (779) is adjacent to the seventh sieving surface (748). Furthermore, as seen in FIGS. 18 and 19, each of the layers has a liner (170, 270, 370, 470, 570, 670, 770), referred to collectively as the "liners" and individually as "liner" and a sieve (140, 240, 340, 440, 540, 640, 740), hereinafter referred to collectively as the "sieves" and individually as the "sieve."

With continued reference to FIGS. 18 and 19, by placing the litter granules (20) on the seventh layer, multiple cleaning operations may be conveniently performed before having to remove the litter granules (10) from the base (110). The owner may periodically clean the litter granules (10) of waste clumps (20) up to seven times, one time for each of the layers. Each cleaning operation consists of removing the liner immediately beneath the litter granules (10) and the waste clumps (20), dumping the litter granules (10) and the waste clumps (20) onto the exposed sieve, withdrawing the sieve and directing the litter granules (10) that pass through the sieve onto the next exposed liner, and disposing of the sieve with any residual waste clumps (20). The process may be repeated at a frequency dictated by the needs of the cat and the preferences of the owner.

In yet another embodiment, the wall (121) is formed with gripping alcoves (132), as seen in FIGS. 9, 18, and 19. In one embodiment, the gripping alcoves (132) provide space between the wall (121) and the layers. In another embodiment, the gripping alcoves (132) provide space between the wall (121) and the layer securing fixtures (112). When the owner desires to clean the waste clumps (20) from the litter granules (10), the owner may easily place their hand into the space created by the gripping alcove (132) to grasp the liner or the sieve in question.

In another embodiment, as seen in FIG. 9, the base (110) is formed with a liner storage compartment (130). The liners may be reusable, rather than disposable as previously discussed. The reusable liners may be conveniently stored within the liner storage compartment (130). As one skilled in the art will appreciate, after the waste clumps (20) are removed from the litter granules (10), reusable liners may be conveniently stored until the last layer is used to clean the litter granules (10). In one embodiment, as seen in FIG. 9, the liner storage compartment (130) is a void space within the base (110). The reusable liners are stacked one on another, and the base (110) is positioned over the stacked liners. As one skilled in the art will appreciate, other storage compartment arrangements are possible. By way of example only, and not limitation, the liners may be placed into individual slots. Alternatively, a single wide slot may be utilized to store the liners with the same convenience. In another embodiment, the reusable liners have perimeters (180, 280, 380, 480, 580, 680, 780) which are curled in an upward manner to facilitate orderly stacking of the liners.

Figure 20:
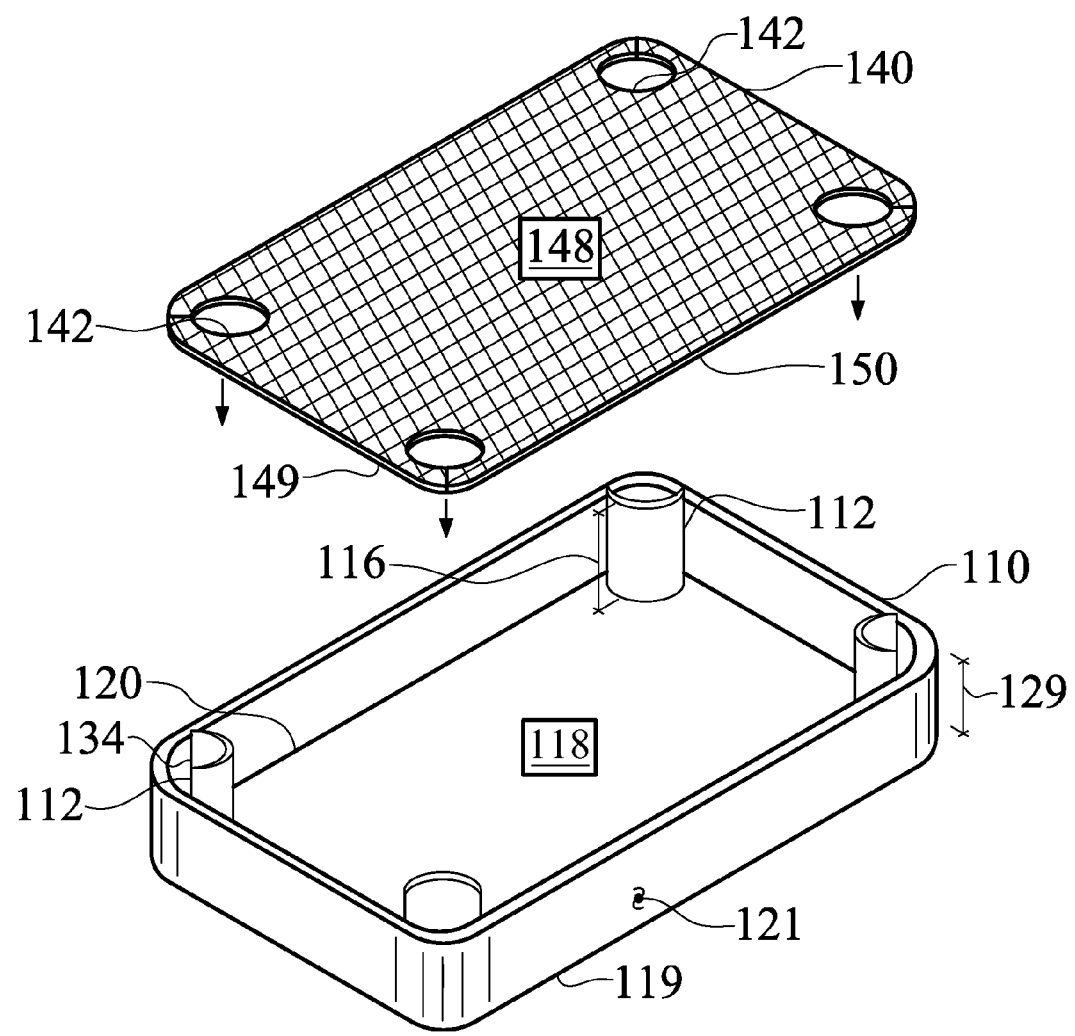
FIG. 20 is an isometric view of an embodiment of the cat litter cleaning system showing the base and a first layer, not to scale.

Although previous embodiments of the cat litter box cleaning system (100) contemplate the use of a first sieve (140) and a first liner (170), the first layer need only comprise a first sieve (140), as seen in FIG. 20. Likewise, a second layer may comprise a second sieve (240), a third layer may comprise a third sieve (340), and so on for additional layers. Thus, each layer may consist only of a single sieve. It should be noted that the sieves may be formed according to any of the previous sieve embodiments described herein. In this particular embodiment, to clean the litter granules (20) of waste clumps (10), the owner may simply remove the uppermost sieve and direct the litter granules (10) that pass through the sieve onto the remaining litter granules (10) and sieves, and then dispose of the uppermost sieve and the residual waste clumps (20). Preferably, an amount of litter granules (10) is used such that the depth of the litter granules (10) above the uppermost sieve is at least two inches.

Figure 21:
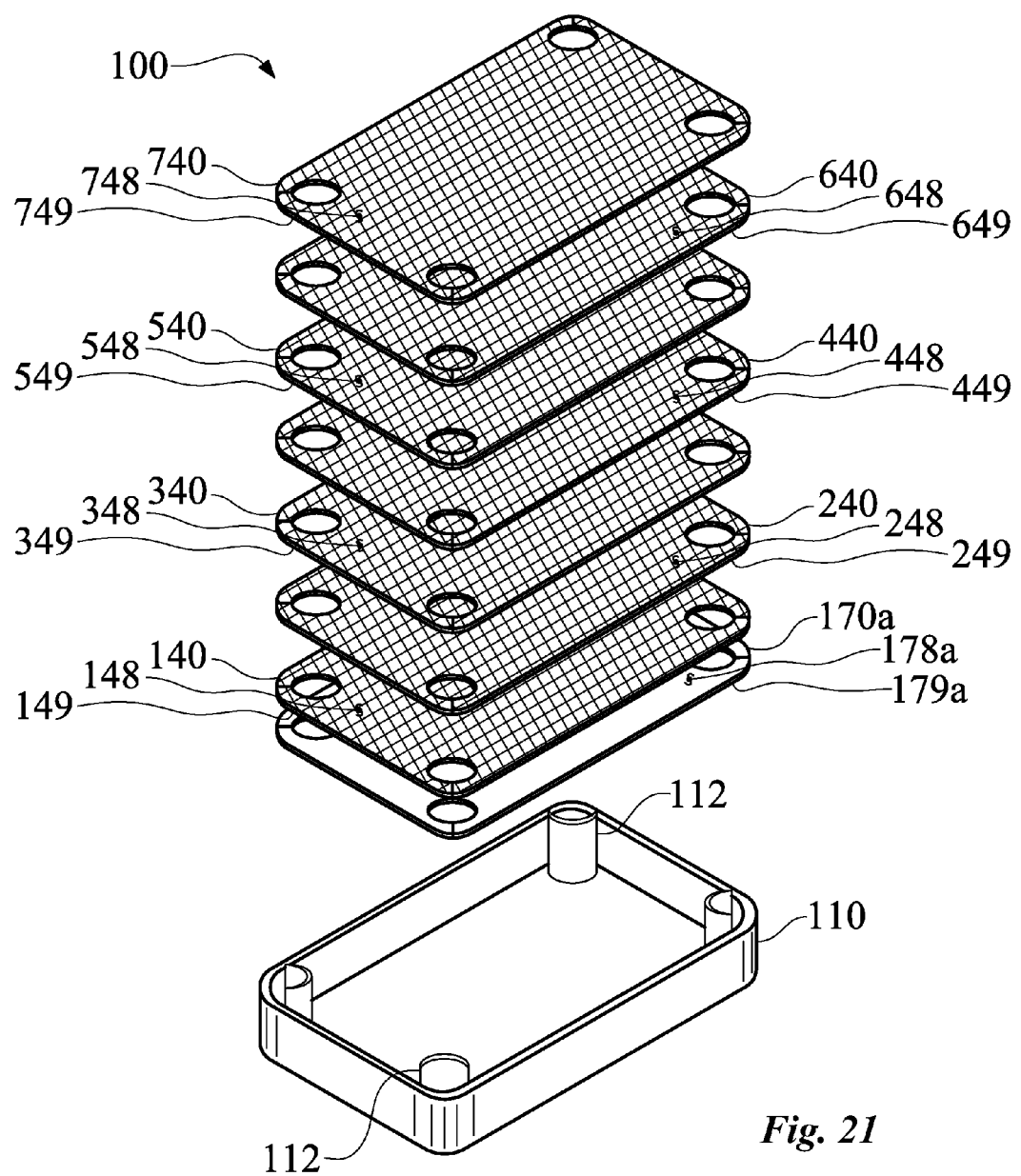
FIG. 21 is an isometric view of an embodiment of the cat litter box cleaning system showing seven layers of sieves and a backing, not to scale.
Figure 22:
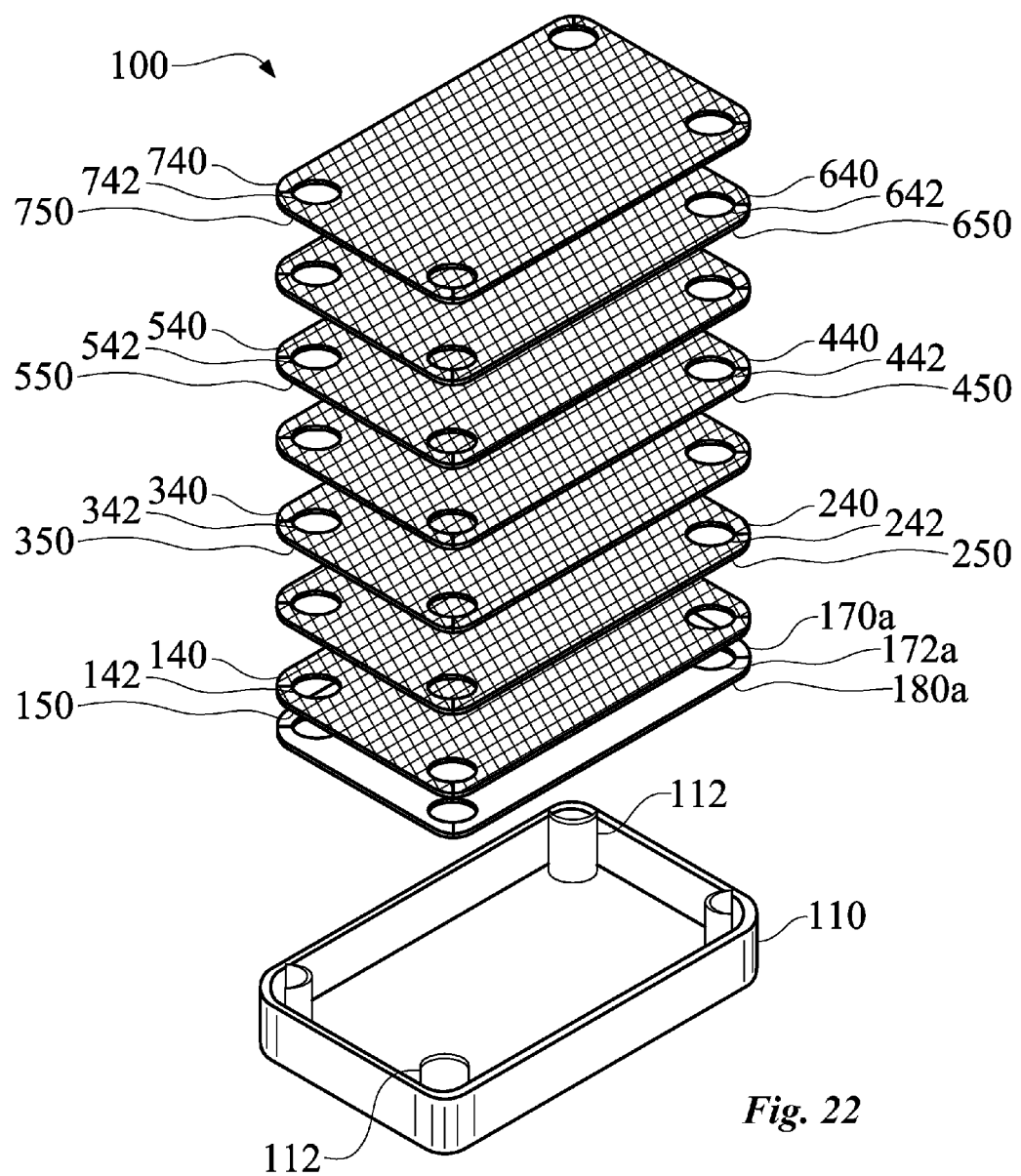
FIG. 22 is an isometric view of an embodiment of the cat litter box cleaning system showing seven layers of sieves and a backing, not to scale.

For convenience, the sieves may be available in packs of at least seven, which would correspond to one cleaning operation each day for a week. In one embodiment, the packs may be manufactured with a backing (170a) on which the sieves lie, as seen in FIGS. 21 and 22. The backing (170a) may have at least two backing securing receptacles (172a), a backing granule contact surface (178a), a backing bottom surface (179a), and a backing perimeter (180a). Although the number of backing securing receptacles (172a) may be equal to the number of layer securing fixtures (112), the number of backing securing receptacles (172a) may be greater than the number of layer securing fixtures (112). The positions of the backing securing receptacles (172a) align with the layer securing fixtures (112) so that one backing securing receptacle (172a) is positioned to cooperate with one layer securing fixture (112) in such a manner that the backing perimeter (180a) and the base perimeter (120) are substantially adjacent. Further, the backing bottom surface (179a) will always be adjacent to the granule contact surface (118) and the backing granule contact surface (178a) will always be adjacent to the first sieve bottom surface (149). Similarly, for a pack of multiple layers consisting of sieves and a backing (170a), the first sieve bottom surface (149) will be adjacent to the backing granule contact surface (178a) and the first sieving surface (148) will be adjacent to the second sieve bottom surface (249), the second sieving surface (248) will be adjacent to the third sieve bottom surface (349), the third sieving surface (348) will be adjacent to the fourth sieve bottom surface (449), and so on for additional layers.

The backing (170a) may be a sheet of flexible or rigid material. The material may be cardboard, plastic, heavy aluminum foil, treated wood, or other urine or feces resistant material. The material may also be resistant to occasional clawing when the cat manages to get its claws in contact with the backing (170a). Thus, the backing (170a) provides a solid structure upon which multiple sieves may rest. Moreover, the backing securing receptacles (172a) are configured to align with the sieve securing receptacles (142) so that placing all of the sieves and the backing (170a) in the base (110) at one time as a single unit is easily accomplished. The backing (170a) also serves as a cover to keep the granule contact surface (118) clean. The backing (170a) may be cleaned and reused or simply discarded after all of the sieves are used.

In yet another embodiment, a method for hygienically removing waste clumps (20) from a plurality of litter granules (10) is provided. In the method, at least two cat litter box cleaning systems (100, 1000) are used, such as seen in FIGS. 21-24. The at least two cat litter box cleaning systems (100, 1000) may be formed according to any of the previously described embodiments. Thus, in one embodiment, each cat litter box cleaning system (100, 1000) may include a base (110, 1100) having a granule contact surface (118, 1180), a base perimeter (120, 1200), and at least two layer securing fixtures (112, 1120). The base perimeter (120, 1200) may have a wall (121, 1210) extending substantially perpendicular from the granule contact surface (118, 1180) to a wall height (129, 1290). The layer securing fixtures (112, 1120) may be attached to and extend substantially perpendicular from the granule contact surface (118, 1180) and may be located within the base perimeter (120, 1200). Further, each cat litter box cleaning system (100, 1000) may include a first layer having a first sieve (140, 1400). The first sieve (140, 1400) may have at least as many first sieve securing receptacles (142, 1420) as layer securing fixtures (112, 1120), a first sieving surface (148, 1480), a first sieve bottom surface (149, 1490), and a first sieve perimeter (150, 1500). The first sieve perimeter (150, 1500) may be substantially the same as the base perimeter (120, 1200). When the first sieve (140, 1400) is placed within the base (110, 1100), the first sieve bottom surface (149, 1490) may be adjacent to the base granule contact surface (118, 1180) and the first sieve securing receptacles (142, 1420) may releasably cooperate with the securing fixtures (112, 1120) such that the first sieve (140, 1400) may be easily removed from the base (110, 1100).

Thus, the first step of the method is to provide a first cat litter box cleaning system (100) as previously described. Next, litter granules (10) are poured into the first cat litter box cleaning system (100). Preferably, an amount of litter granules (10) is used such that the depth of the litter granules (10) above the uppermost sieve is at least two inches.

As the owner desires, a cleaning operation may be performed to remove the waste clumps (20) from the litter granules (10). The cleaning operation comprises releasing the uppermost sieve from the layer securing fixture (112), removing the uppermost sieve so that the litter granules (10) pass through the uppermost sieve and into the base (110) while the waste clumps (20) are retained on the sieving surface, and disposing of the uppermost sieve and waste clumps (20). The cleaning operation may be repeated until all of the sieves are disposed.

Figure 23:
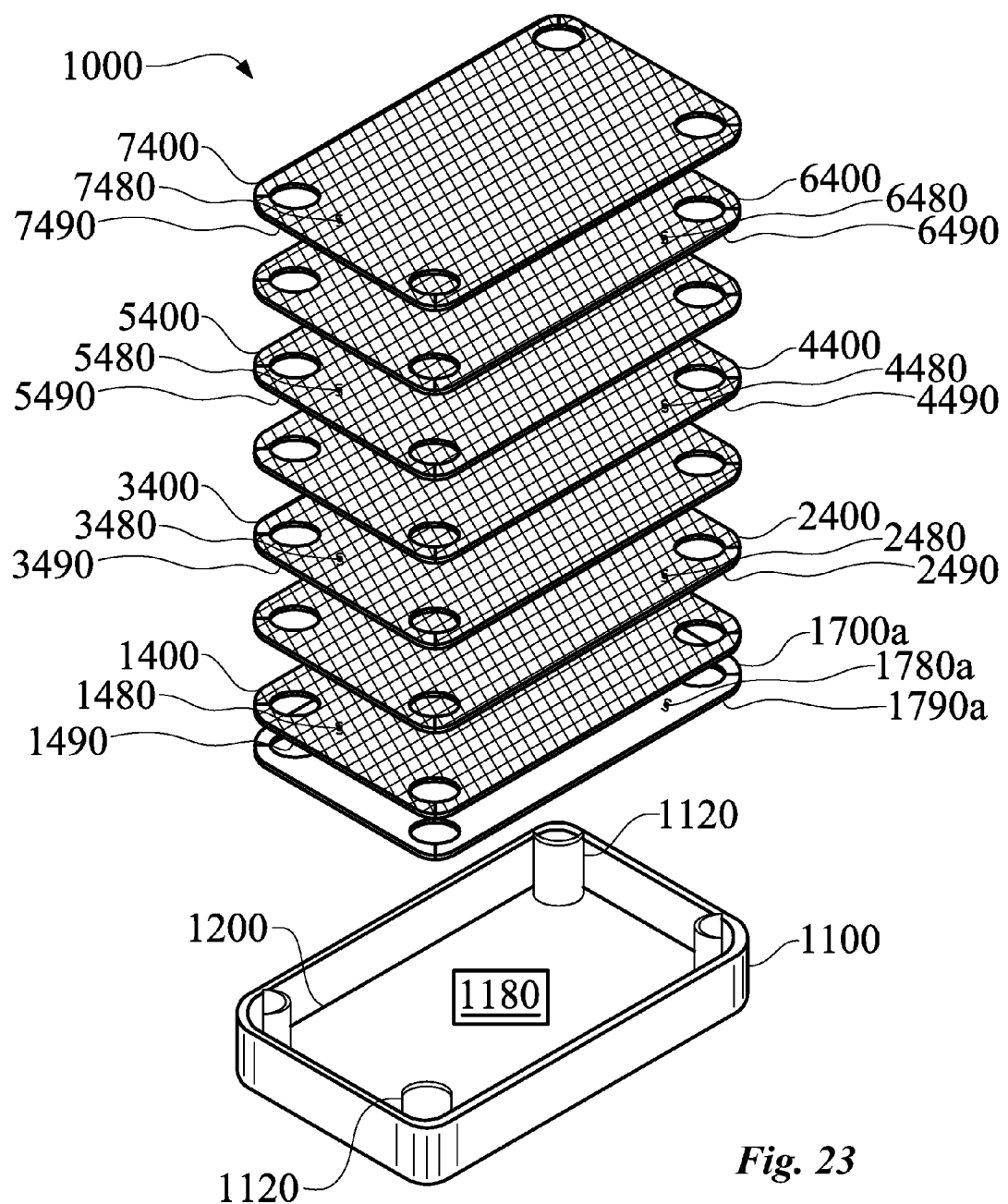
FIG. 23 is an isometric view of an embodiment of a second cat litter box cleaning system showing seven layers of sieves and a backing, not to scale.
Figure 24:
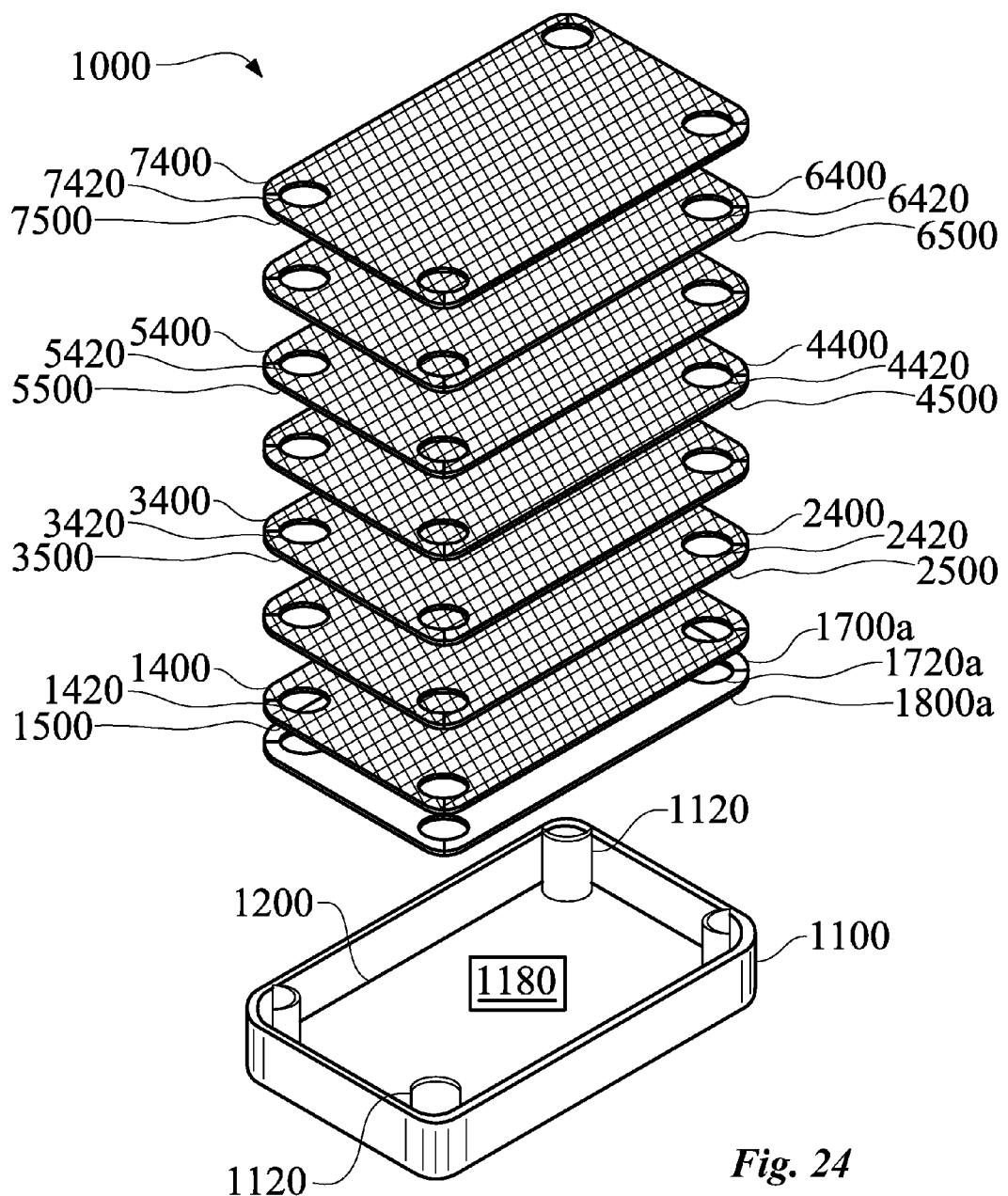
FIG. 24 is an isometric view of an embodiment of a second cat litter box cleaning system showing seven layers of sieves and a backing, not to scale.

Next, a second cat litter box cleaning system (1000) is provided, as seen in FIGS. 23 and 24. New litter granules (10) are poured into the second cat litter box cleaning system (1000) such that the depth of the new litter granules (10) above the uppermost sieve is at least two inches. Now, the used, but clean, litter granules (10) from the first cat litter box cleaning system (100) are poured on top of the new litter granules (10). Finally, the previously described cleaning operation may be performed on the second cat litter box cleaning system (1000) by the owner until all of the sieves are used and disposed of.

By using at least two cat litter box cleaning systems (100, 1000), it will ensure that fresh, new litter granules (10) always form the basis of the litter granules (10) used in the cat litter box cleaning systems (100, 1000). Moreover, the method will help prevent wasting used, but clean, litter granules (10) that are often discarded in conventional cat litter systems. Moreover, by ensuring that new litter granules (10) always form the basis of the litter granules (10) used, unpleasant odors can be reduced.

Figure 25:
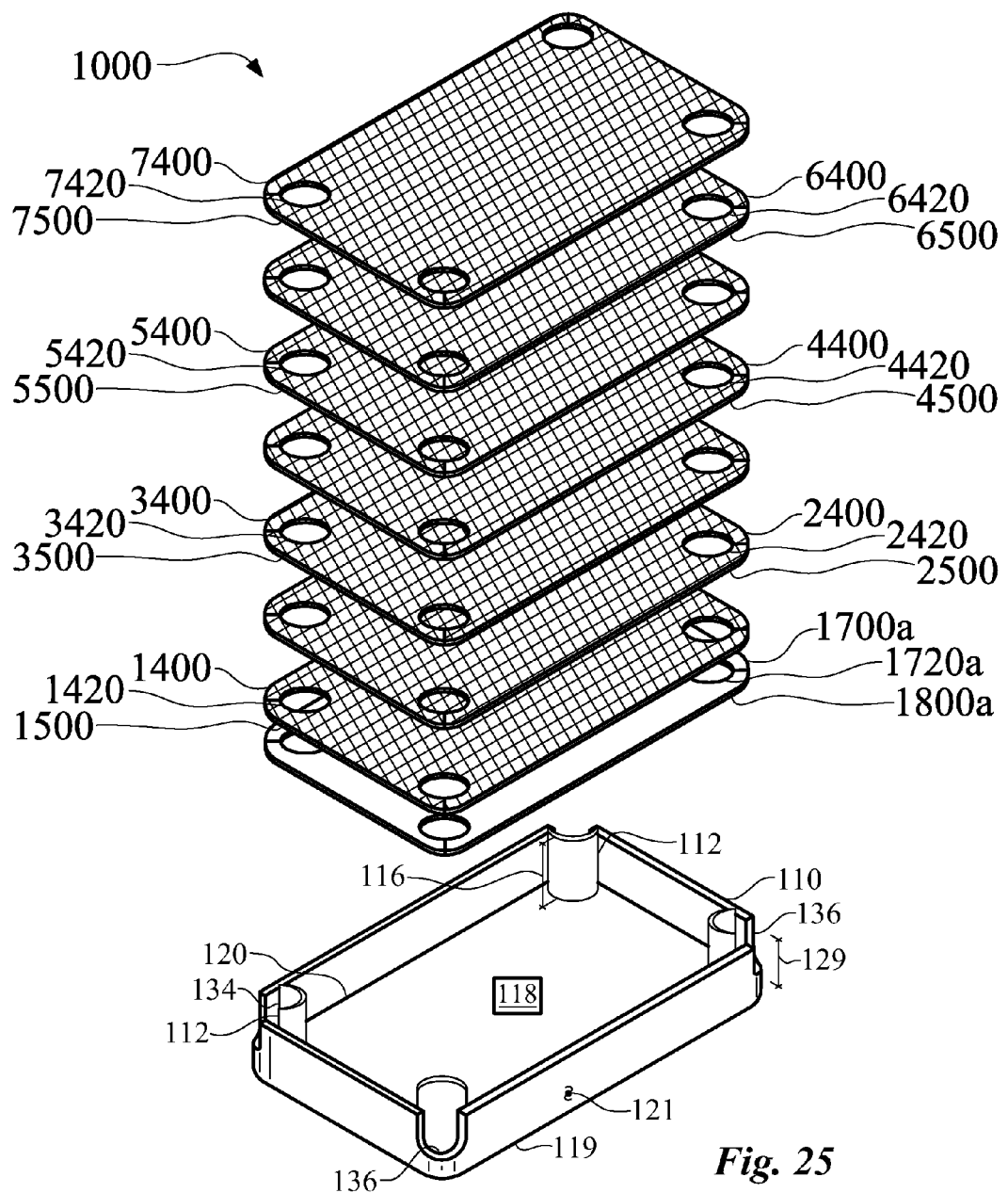
FIG. 25 is an isometric view of an embodiment of a cat litter box cleaning system showing seven layers of sieves and a backing, not to scale.

One skilled in the art will readily see that any features taught above may be combined with other features, even if such combination has not been explicitly iterated or illustrated above. By way of example only, and not limitation in that regard, in yet another embodiment, seen in FIG. 25, the cleaning system (1000) as illustrated in FIG. 24 and described above, may be combined with the base (110) having access notches (136), as illustrated in FIG. 8d, and also described above.

Numerous alterations, modifications, and variations of the preferred embodiments disclosed herein will be apparent to those skilled in the art and they are all anticipated and contemplated to be within the spirit and scope of the claimed cat litter box cleaning system (100). For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the cat litter box cleaning system (100) are described herein, it is to be understood that the practice of such additional modifications and variations and the equivalents thereof, are within the spirit and scope of the cat litter box cleaning system (100) as defined in the following claims. The corresponding structures, materials, acts, and equivalents of all means or step plus function elements in the claims below are intended to include any structure, material, or acts for performing the functions in combination with other claimed elements as specifically claimed.

I claim:

1. A cat litter box cleaning system (100) for hygienically removing waste clumps (20) from a plurality of litter granules (10), comprising:
    (a) a solid base (110) having a granule contact surface (118), a base perimeter (120), wherein the base perimeter (120) has a wall (121) extending substantially perpendicular from the granule contact surface (118) to a wall height (129);
    (b) at least two posts (113) having a securing fixture height (116) and a cross section (114), and wherein the posts (113) and the wall (121) cooperate to form an access port (134) that receives a portion of the first sieve (140) such that an owner may release the first sieve securing receptacles (142) from the posts (113) and remove the first sieve (140) without contacting the litter granules (10), wherein the posts (113) are free-standing of the wall (121) and are attached to and extend substantially perpendicular from the granule contact surface (118), the posts (113) located within the base perimeter (120) and spaced from portions of the wall (121) nearest the posts (113) by less than about ¼ inch;
    (c) a first layer having a first sieve (140), wherein the first sieve (140) has at least as many first sieve securing receptacles (142) as posts (113), a first sieving surface (148), a first sieve bottom surface (149), and a first sieve perimeter (150), wherein the first sieve perimeter (150) is substantially the same as the base perimeter (120), the first sieve bottom surface (149) is adjacent to the base granule contact surface (118), and the first sieve securing receptacles (142) releasably cooperate with the posts (113), the posts (113) passing through the sieve securing receptacles (142); and
    (d) wherein the waste clumps (20) are separated from the litter granules (10) by
        (i) releasing the first sieve securing receptacles (142) from the posts (113), and
        (ii) removing the first sieve (140) so that the litter granules (10) pass through the first sieve (140) and into the base (110) while the waste clumps (20) are retained on the first sieving surface (148).

2. The cat litter box cleaning system (100) of claim 1, wherein the first sieve (140) further includes a first sieve gripping extension (160), wherein the first sieve gripping extension (160) is configured to be received within the access port (134) to provide an owner with gripping access for removing the first sieve (140) without contacting the litter granules (10).

3. The cat litter box cleaning system (100) of claim 2, wherein the first sieve gripping extension (160) is a first sieve gripping extension tab (162).

4. A cat litter box cleaning system (100) for hygienically removing waste clumps (20) from a plurality of litter granules (10), comprising:
- (a) a solid base (110) having a granule contact surface (118), a base perimeter (120), wherein the base perimeter (120) has a wall (121) extending substantially perpendicular from the granule contact surface (118) to a wall height (129);
- (b) at least two layer securing fixtures (112), wherein the layer securing fixtures (112) are posts (113) having a securing fixture height (116) and a cross section (114) that includes a concave portion with a first terminating end (114*a*) and a second terminating end (114*b*), wherein the posts (113) are:
  - (i) attached to and extend substantially perpendicular from the granule contact surface (118);
  - (ii) located within the base perimeter (120); and
  - (iii) free-standing of the wall and spaced from the wall (121) nearest the first terminating end (114*a*) and the second terminating end (114*b*) by less than about ¼ inch;
- (c) at least two access ports (134), wherein the access ports (134) are formed by the cooperation of the posts (113) and the wall (121) and the access ports (134) are defined by a partially bounded area (135) between about 0.6 square inches to about 1.5 square inches;
- (d) a first layer having a first sieve (140), wherein the first sieve (140) has at least as many first sieve securing receptacles (142) as posts (113), a first sieving surface (148), a first sieve bottom surface (149), and a first sieve perimeter (150), wherein the first sieve perimeter (150) is substantially the same as the base perimeter (120), the first sieve bottom surface (149) is adjacent to the base granule contact surface (118), and the first sieve securing receptacles (142) releasably cooperate with the posts (113)), the posts (113) passing through the sieve securing receptacles (142) such that a portion of the first sieve (140) is within the access ports (134); and
- (e) wherein the waste clumps (20) are separated from the litter granules (10) by
  - (i) grasping the portions of the first sieve (140) within the access ports (134) and releasing the first sieve securing receptacles (142) from the posts (113), and
  - (ii) removing the first sieve (140) so that the litter granules (10) pass through the first sieve (140) and into the base (110) while the waste clumps (20) are retained on the first sieving surface (148).

* * * * *